(12) United States Patent
Embry et al.

(10) Patent No.: US 11,125,875 B2
(45) Date of Patent: Sep. 21, 2021

(54) UNDERWATER OPTICAL METROLOGY SYSTEM

(71) Applicant: 3D at Depth, Inc., Longmont, CO (US)

(72) Inventors: Carl W. Embry, Boulder, CO (US);
 Neil Manning, Longmont, CO (US);
 Ian Roberts, Houston, TX (US)

(73) Assignee: 3D at Depth, Inc., Longmont, CO (US)

( * ) Notice: Subject to any disclaimer, the term of this patent is extended or adjusted under 35 U.S.C. 154(b) by 81 days.

(21) Appl. No.: 16/707,204

(22) Filed: Dec. 9, 2019

(65) Prior Publication Data

US 2020/0124722 A1 Apr. 23, 2020

Related U.S. Application Data

(63) Continuation of application No. 16/559,005, filed on Sep. 3, 2019, now Pat. No. 10,545,233, which is a
(Continued)

(51) Int. Cl.
 *G01S 15/87* (2006.01)
 *G01S 17/93* (2020.01)
 (Continued)

(52) U.S. Cl.
 CPC ............ *G01S 15/874* (2013.01); *B63G 8/001* (2013.01); *B63G 8/38* (2013.01); *G01C 13/00* (2013.01);
 (Continued)

(58) Field of Classification Search
 CPC ........ G01S 15/874; G01S 15/86; G01S 17/86; G01S 17/42; G01S 15/74; G01S 15/87;
 (Continued)

(56) References Cited

U.S. PATENT DOCUMENTS 4,123,160 A  10/1978 Caputo et al.
5,026,999 A  6/1991 Leonard
(Continued)

FOREIGN PATENT DOCUMENTS

CN  105716591  6/2016
EP  1321777  6/2003
(Continued)

OTHER PUBLICATIONS

Artlett et al., "Optical remote sensing of water temperature using Raman spectroscopy," Optics Express, vol. 23, No. 25, Dec. 14, 2015, 13 pages.
(Continued)

*Primary Examiner* — Daniel Pihulic
(74) *Attorney, Agent, or Firm* — Sheridan Ross P.C.

(57) ABSTRACT

Described herein are methods and devices for improved location of any and all underwater structures or equipment installed underwater. In particular, systems are disclosed that combine optical and acoustic metrology for locating objects in underwater environments. The systems allow for relative positions of objects to be determined with great accuracy using optical techniques, and support enhanced location of devices that utilize acoustic location techniques. In addition, location information can be provided by the system even in conditions that make optical metrology techniques impossible or impractical.

30 Claims, 21 Drawing Sheets

Related U.S. Application Data continuation of application No. 16/031,867, filed on Jul. 10, 2018, now Pat. No. 10,502,829.

(60) Provisional application No. 62/530,747, filed on Jul. 10, 2017.

(51) Int. Cl.

| | | |
|---|---|---|
| *G01S 17/89* | (2020.01) | |
| *G01S 17/88* | (2006.01) | |
| *B63G 8/38* | (2006.01) | |
| *B63G 8/00* | (2006.01) | |
| *G01C 21/20* | (2006.01) | |
| *G01S 17/42* | (2006.01) | |
| *G01S 15/74* | (2006.01) | |
| *G01C 13/00* | (2006.01) | |
| *G01S 15/86* | (2020.01) | |
| *G01S 17/86* | (2020.01) | |
| *G01S 17/74* | (2006.01) | |

(52) U.S. Cl.
CPC .............. *G01C 21/20* (2013.01); *G01S 15/74* (2013.01); *G01S 15/86* (2020.01); *G01S 15/87* (2013.01); *G01S 17/42* (2013.01); *G01S 17/86* (2020.01); *G01S 17/88* (2013.01); *G01S 17/93* (2013.01); *B63G 2008/005* (2013.01); *G01S 17/74* (2013.01)

(58) Field of Classification Search
CPC .......... G01S 17/93; G01S 17/88; G01S 17/74; G01S 17/89; G01S 17/87; G01S 5/16; G01S 5/18; B63G 8/001; B63G 8/38; B63G 2008/005; G03B 42/06; G03B 17/08; G01C 21/1656; G01C 13/00; G01C 21/20; G01C 15/002
See application file for complete search history.

(56) References Cited

U.S. PATENT DOCUMENTS

| | | | |
|---|---|---|---|
| 5,311,272 | A | 5/1994 | Daniels et al. |
| 5,343,284 | A | 8/1994 | Keeler et al. |
| 5,384,589 | A | 1/1995 | Ulich et al. |
| 6,672,131 | B1 | 1/2004 | Aldal et al. |
| 6,836,285 | B1 | 12/2004 | Lubard et al. |
| 7,139,647 | B2 | 11/2006 | Larsen |
| 7,683,928 | B2 | 3/2010 | Lubard et al. |
| 7,688,348 | B2 | 3/2010 | Lubard et al. |
| 8,184,276 | B2 | 5/2012 | Embry |
| 8,380,375 | B2 | 2/2013 | Tink |
| 8,467,044 | B2 | 6/2013 | Embry |
| 8,903,576 | B2 | 12/2014 | Tink |
| 8,929,176 | B2 | 1/2015 | Debrunner et al. |
| 8,960,008 | B1 | 2/2015 | Blackmon et al. |
| 9,223,025 | B2 | 12/2015 | Debrunner et al. |
| 9,229,108 | B2 | 1/2016 | Debrunner et al. |
| 9,330,633 | B2 | 5/2016 | Sakai et al. |
| 9,348,026 | B2 | 5/2016 | Armbruster et al. |
| 9,511,831 | B2 | 12/2016 | Kimura et al. |
| 9,568,590 | B1 | 2/2017 | Haupt et al. |
| 9,776,695 | B2 | 10/2017 | Kimura et al. |
| 9,846,232 | B1 | 12/2017 | Thompson et al. |
| 10,183,732 | B2 | 1/2019 | Celikkol et al. |
| 10,450,041 | B2 | 10/2019 | Kimura et al. |
| 10,502,829 | B2 | 12/2019 | Embry et al. |
| 10,545,233 | B1 | 1/2020 | Embry et al. |
| 10,871,567 | B2* | 12/2020 | Embry ................. G01C 13/00 |
| 2002/0038187 | A1 | 3/2002 | Maness et al. |
| 2002/0170792 | A1 | 11/2002 | Phelan et al. |
| 2003/0079774 | A1 | 5/2003 | Reyman |
| 2004/0093174 | A1 | 5/2004 | Lander |
| 2004/0261547 | A1 | 12/2004 | Russell et al. |
| 2005/0060105 | A1 | 3/2005 | Lander |
| 2005/0279169 | A1 | 12/2005 | Lander |
| 2006/0221349 | A1 | 10/2006 | Que et al. |
| 2006/0233485 | A1 | 10/2006 | Allen |
| 2007/0095153 | A1 | 5/2007 | Rieder et al. |
| 2007/0130317 | A1 | 6/2007 | Lander |
| 2007/0199383 | A1 | 8/2007 | Lander et al. |
| 2007/0242134 | A1 | 10/2007 | Zernov |
| 2008/0300742 | A1 | 12/2008 | Weaver et al. |
| 2009/0141591 | A1 | 6/2009 | Basilico |
| 2009/0287414 | A1 | 11/2009 | Vickery |
| 2010/0037707 | A1 | 2/2010 | Bitto et al. |
| 2010/0089161 | A1 | 4/2010 | Taheri |
| 2010/0324839 | A1 | 12/2010 | Martin |
| 2011/0088910 | A1 | 4/2011 | McCann et al. |
| 2011/0116074 | A1 | 5/2011 | Valla et al. |
| 2011/0144930 | A1 | 6/2011 | Bruno et al. |
| 2011/0197681 | A1 | 8/2011 | Rieder et al. |
| 2012/0007743 | A1 | 1/2012 | Solomon |
| 2012/0022822 | A1 | 1/2012 | Rousselle |
| 2012/0062963 | A1 | 3/2012 | Gillham et al. |
| 2012/0099395 | A1 | 4/2012 | Debrunner et al. |
| 2012/0124850 | A1 | 5/2012 | Ortleb et al. |
| 2012/0213320 | A1 | 8/2012 | Lange et al. |
| 2013/0030577 | A1 | 1/2013 | Jarrell et al. |
| 2013/0061688 | A1 | 3/2013 | Hayward |
| 2013/0215012 | A1 | 8/2013 | Reddy et al. |
| 2014/0022530 | A1 | 1/2014 | Farhadiroushan et al. |
| 2014/0054429 | A1 | 2/2014 | Conzen et al. |
| 2014/0078409 | A1 | 3/2014 | Wang et al. |
| 2014/0174186 | A1 | 6/2014 | Salomon |
| 2014/0268107 | A1 | 9/2014 | Kremeyer |
| 2014/0283585 | A1 | 9/2014 | Sæther |
| 2014/0320629 | A1 | 10/2014 | Chizeck et al. |
| 2014/0328141 | A1 | 11/2014 | Rikoski et al. |
| 2015/0078123 | A1 | 3/2015 | Batcheller et al. |
| 2015/0116692 | A1 | 4/2015 | Zuk et al. |
| 2015/0153743 | A1 | 6/2015 | Jarrell et al. |
| 2015/0363914 | A1 | 12/2015 | Boyle et al. |
| 2016/0198069 | A1 | 7/2016 | Boyle et al. |
| 2016/0198074 | A1 | 7/2016 | Boyle et al. |
| 2016/0320526 | A1 | 11/2016 | Chen et al. |
| 2017/0089829 | A1 | 3/2017 | Bartholomew |
| 2017/0328751 | A1 | 11/2017 | Lemke |
| 2017/0328982 | A1 | 11/2017 | Jongsma et al. |
| 2018/0194446 | A1 | 7/2018 | Fruhling et al. |
| 2018/0321385 | A1 | 11/2018 | Embry et al. |
| 2019/0011552 | A1* | 1/2019 | Embry ............... G01C 21/1656 |
| 2019/0011565 | A1* | 1/2019 | Embry .................... G01S 15/74 |
| 2019/0031308 | A1 | 1/2019 | Daley et al. |
| 2019/0084658 | A1 | 3/2019 | Bonel et al. |
| 2019/0219701 | A1 | 7/2019 | Embry et al. |
| 2019/0234808 | A1 | 8/2019 | Speck et al. |
| 2020/0011992 | A1* | 1/2020 | Embry .................... G01S 15/74 |
| 2020/0124722 | A1* | 4/2020 | Embry .................... G03B 17/08 |

FOREIGN PATENT DOCUMENTS

| | | |
|---|---|---|
| EP | 3524949 | 8/2019 |
| KR | 101426474 | 8/2014 |
| WO | WO 2011/161513 | 12/2011 |
| WO | WO 2015/011270 | 1/2015 |
| WO | WO 2016/068715 | 5/2016 |
| WO | WO 2016/142576 | 9/2016 |
| WO | WO 2019/014245 | 1/2019 |
| WO | WO 2019/014253 | 1/2019 |

OTHER PUBLICATIONS

Leonard et al., "Experimental remote sensing of subsurface temperature in natural ocean water," Geophysical Research Letters, vol. 4, No. 7, Jul. 1977, pp. 279-281. Abstract only.

McKeever et al., "The Thermographic Phosphor Labkit," 2015 BFY Proceedings, American Association of Physics Teachers, Nov. 2015, pp. 68-71.

Otto et al., "Thermo-Chromium: A Contactless Optical Molecular Thermometer," Chemistry, vol. 23, 2017, pp. 12131-12135.

(56) References Cited

OTHER PUBLICATIONS

Schorsten et al., "Depth-resolved temperature measurements of water using the Brillouin lidar technique," Applied Physics B, vol. 97, No. 931, Jul. 24, 2009, pp. 931-934. Abstract only.
U.S. Appl. No. 17/093,932, filed Nov. 10, 2020, Embry et al.
Embry, "High Resolution 3D Laser Imaging for Inspection, Maintenance, Repair, and Operations," RPSEA Phase 1 Final Report, Mar. 9, 2012, 48 pages.
Ishida et al., "Marker based camera pose estimation for underwater robots," 2012 IEEE/SICE International Symposium on System Integration, Kyushu University, Fukuoka, Japan, Dec. 16-18, 2012, 6 pages.
Extended European Search Report for European Patent Application No. 18832318.2, dated Mar. 17, 2021, 131 pages.
Isomäki et al., "Monitoring of the Submerged Structures of Dams," VRT Finland, 84th ICOLD Annual Meeting, May 20, 2016, 8 pages.
Park et al., "Visualization using 3D voxelization of full lidar waveforms," Institute of Electrical and Electronics Engineers, Proceedings of SPIE, vol. 9262, Nov. 17, 2014, 10 pages.
"Chevron Frade Field Incident," YouTube, Nov. 24, 2011, 11 pages [retrieved from: www.youtube.com/watch?v=OtJTI4nv1QI].
"Subsea Piping Vibration for new and existing systems," Wood, 2018, 3 pages [retrieved online from: www.betamachinery.com/services/subsea-piping-vibration].
"Subsea Acceleration and Vibration Logger," Omni Instruments, 2009, 4 pages [retrieved online from: www.omniinstruments.co.uk/subsea-acceleration-and-vibration-logger.html].
"Subsea Leak Detection—an Overview," Neptune Oceanographics Limited, 2015, 5 pages [retrieved online from: www.neptuneoceanographics.com/documents/LeakReport2015.pdf].
"Ultrasonic Intelligent Sensors ClampOn Subsea 3D Vibration Monitor Digital Signal Processing," ClampOn AS, May 2016, 2 pages.
Coimbra et al. "Chevron fined $28 million, faces Brazil spill backlash," Reuters, Nov. 21, 2011, 12 pages [retrieved online from: www.reuters.com/article/us-chevron-brazil/chevron-fined-28-million-faces-brazil-spill-backlash-idUSTRE7AG15S20111122].
Hariharan et al. "Drilling Riser Management in Deepwater Environments," Pulse Structural Monitoring, Feb. 2007, 9 pages [retrieved online from: www.pulse-monitoring.com/assets/uploads/cms/files/118-64.pdf].
Lim et al. "Deepwater Riser VIV, Fatigue and Monitoring," Presented at Deepwater Pipeline & riser Technology Conference, Houston, Mar. 6-9, 2000, 12 pages [retrieved online from: www.puls-monitoring.com/assets/uploads/cms/files/135-64.pdf].
Nilson "Ultrasonic Intelligent Sensors Advanced LPHP Subsea 3D Vibration Monitor," ClampOn AS, Jun. 2016, Revision 3, 2 pages.
Nilson "Ultrasonic Intelligent Sensors Standalone LPHP Subsea Vibration Monitor," ClampOn AS, Jun. 2016, Revision 4, 2 pages.
Paschoa "Understanding Subsea Acoustic Leak Detection and Condition Monitoring—Part 2," Marine Technology News, Oct. 7, 2014, 7 pages [retrieved online from: https://www.marinetechnologynews.com/blogs/understanding-subsea-accoustic-leak-detection-and-condition-omonitoring-e28093-part-2-700516].
Prats et al. "Template Tracking and Visual Serving for Alignment Tasks with Autonomous Underwater Vehicles," The International Federation of Automatic Control, Sep. 19-21, 2012, 9th IFAC Conference on Maneuvering and Control of Marine Craft, 2012, Arenzano, Italy, 6 pages.
Skalle et al. "Wells and Well Intervention, Evaluation of deepwater kicks and future countermeasures," Norwegian University of Science and Technology, Mar. 2012, 15 pages [retrieved online from: www.ipt.ntnu.no/~pskalle/files/TechnicalPapers/23_deepwaterkick.pdf].
International Search Report and Written Opinion for International (PCT) Patent Application No. PCT/US18/41488, dated Sep. 20, 2018 13 pages.
International Preliminary Report on Patentability for International (PCT) Application No. PCT/US2018/041488, dated Jan. 23, 2020, 10 pages.
Notice of Allowance for U.S. Appl. No. 16/031,867, dated Aug. 1, 2019, 7 pages.
Notice of Allowance for U.S. Appl. No. 16/559,005, dated Oct. 21, 2019, 7 pages.

* cited by examiner

UNDERWATER OPTICAL METROLOGY SYSTEM

CROSS-REFERENCE TO RELATED APPLICATIONS

This application is a continuation of U.S. patent application Ser. No. 16/559,005, filed Sep. 3, 2019, which is a continuation of U.S. patent application Ser. No. 16/031,867, filed Jul. 10, 2018, which claims the benefit of U.S. Provisional Patent Application Ser. No. 62/530,747, filed Jul. 10, 2017, the entire disclosures of which are hereby incorporated herein by reference.

FIELD

The present disclosure is directed to methods and systems for determining the location of underwater objects, making measurements between objects, and facilitating the positioning of objects underwater using optical and acoustical metrology techniques.

BACKGROUND

The accurate placement and monitoring of underwater equipment, such as wellheads, manifolds, risers, anchors, Pipeline End Terminations (PLETS), Blow Out Preventors (BOPs), pumps, touch down points, suction piles, chains, slip joints, templates and pipelines is important to ensuring the safe and reliable operation of such equipment. However, the methods available in underwater environments are limited when compared to surface environments. For example, radio frequencies are severely attenuated in underwater environments, making radio frequency based location systems, such as a Global Navigation Satellite System (GNSS) like the U.S. Global Positioning System (GPS) and the now obsolete long range navigation (LORAN) systems, unusable at depth. In addition, conventional land survey techniques, for example using theodolites and measuring tapes, can be limited by limited visibility, and because they typically must be operated directly by a human, which may not be possible or practicable in certain underwater scenarios. As a result, accurately determining the location of equipment and measurements between equipment in underwater environments during installation and survey operations is challenging.

Conventional techniques for determining a location underwater can include the use of inertial navigation units (INUs). In addition, arrays of acoustic transducers having known locations can be used for determining location within or near the array. Although acoustic techniques can provide relative bearing and distance information, the accuracy and precision of such systems is relatively low. For example, relative locations can at best be determined with an accuracy of several centimeters.

More precise location information can be obtained using active optical techniques. For instance, underwater lidar systems are available that can provide relative location with a precision of several millimeters or less. However, such systems can suffer from limited operational range, particularly in turbid water conditions.

Accordingly, it would be desirable to provide systems and methods that allowed for reliable and precise determination of location in underwater environments.

SUMMARY

The present disclosure provides systems and methods for determining a location of objects and measurements between objects underwater. In accordance with embodiments of the present disclosure, the systems and methods utilize a combination of optical and acoustical methodologies for determining the locations of objects in an underwater environment. In accordance with at least some embodiments of the present disclosure, a metrology system incorporates a monitoring system that includes a lidar device and an acoustic transceiver. In accordance with still other embodiments of the present disclosure, acoustic transponders are provided with target indicia and memory for storing location information. The disclosed systems and methods enable the location of underwater objects to be determined precisely and reliably by using both optical and acoustical methodologies.

A combined system in accordance with embodiments of the present disclosure can include one or more metrology systems that each incorporate an optical metrology instrument, such as a light detection and ranging system (hereinafter "lidar") monitoring device. In such embodiments, the lidar device can be in the form of a scanning lidar, flash lidar, pulsed laser lidar, amplitude modulated continuous wave (AMCW) phase detection lidar, chirped AMCW lidar, amplitude frequency modulated continuous wave (FMCW) lidar, true FMCW lidar, pulse modulation code, or other lidar system. Moreover, the lidar system can incorporate a pulsed or modulated continuous wave laser light source. Other embodiments can include a monitoring system incorporating a laser triangulation, photometric stereo, stereoscopic vision, structured light, photoclinometry, stereo-photoclinometry, holographic, digital holographic, or other device that uses light to sense 3-D space. Scanning lidars can include a single spot scan or multiple single spots can be scanned. In addition, the one or more metrology systems can incorporate an acoustic transceiver. The acoustic transceiver can operate at acoustic frequencies to enable the metrology system to locate acoustic transponders or other acoustic emitters, and to communicate with acoustic transponders or other receiving devices, such as other acoustic transceivers.

The combined system can also include one or more acoustic transponders. Each acoustic transponder generally includes an acoustic transducer, target indicia, and memory. In general, the acoustic transducer can be operated to emit an identification signal to identify the associated acoustic transducer. In addition, the acoustic transducer of an acoustic transponder can be operated to emit a signal that allows a receiving device, such as another acoustic transponder or an acoustic transceiver of a metrology device, to determine a range and bearing to the emitting acoustic transducer. In addition, in accordance with embodiments of the present disclosure, target indicia can be included to uniquely identify the associated acoustic transducer. Alternatively, or in addition, the target indicia can be configured to identify a location of the acoustic transducer of the acoustic transponder. In accordance with still other embodiments of the present disclosure, each acoustic transponder can include memory, which can be used to store a location of the acoustic transponder.

Methods in accordance with embodiments of the present disclosure include providing a plurality of acoustic transponders having target indicia and an acoustic transducer. Dimensional control data concerning the relationship of the target indicia to the acoustic transducer for each acoustic transponder is recorded prior to placing the acoustic transponders in underwater locations. After placing the acoustic transponders, one or more metrology systems can be placed in underwater locations in the vicinity of at least one of the acoustic transponders. The metrology system can be located approximately, for example using an included inertial navigation unit, or more precisely, for example using an optically determined range and bearing relative to a monument or other reference. The metrology system can then be operated to generate point cloud data that includes returns from target indicia of at least one of the acoustic transponders. The location of the acoustic transponder can then be determined from the point cloud data. In accordance with embodiments of the present disclosure, the location information can be communicated from the metrology system to the acoustic transponder, and can be stored in the acoustic transponder. The location information stored by the acoustic transponder can be communicated to other acoustic transponders as part of or as a supplement to conventional range and bearing signals.

Embodiments of the present disclosure provide a combined optical and acoustical locating and positioning system that includes an optical based metrology system and acoustic devices or beacons, referred to herein as acoustic transponders. More particularly, the metrology system can determine the relative locations of acoustic transponders within a field with great accuracy (e.g., plus or minus several millimeters). This location information can then be passed to the acoustic transponders themselves. The combined use of an optical based metrology system and acoustic transponders within a field can allow for accurate positioning of structures or vehicles within the field, while using fewer acoustic transponders than might otherwise be necessary, and while providing duplicate, complementary positioning signals (i.e. light based and sound based signals).

Optical targets can be affixed to undersea structures or acoustic beacons to enhance the identification and locating of such structures by a metrology system. The optical targets can be two or three dimensional. The optical targets can be configured in a known relationship relative to an acoustic transponder and in particular to an acoustic transducer provided as part of the acoustic transponder, to allow the precise location of the acoustic transducer by an optical metrology system. In addition, different targets can have different optical characteristics, to allow the different targets to be distinguished from one another by the metrology system. In accordance with at least some embodiments of the present disclosure, the optical targets can vary characteristics of the light that is reflected back to the metrology system. Such characteristics can include the intensity, pattern, frequency, phase, or polarization of the light. In addition, the targets can encode information using barcodes, holograms, human or machine recognition perceptible indicia, or the like.

Additional features and advantages of embodiments of the present disclosure will become more readily apparent from the following description, particularly when taken together with the accompanying drawings.

DETAILED DESCRIPTION

Figure 1:
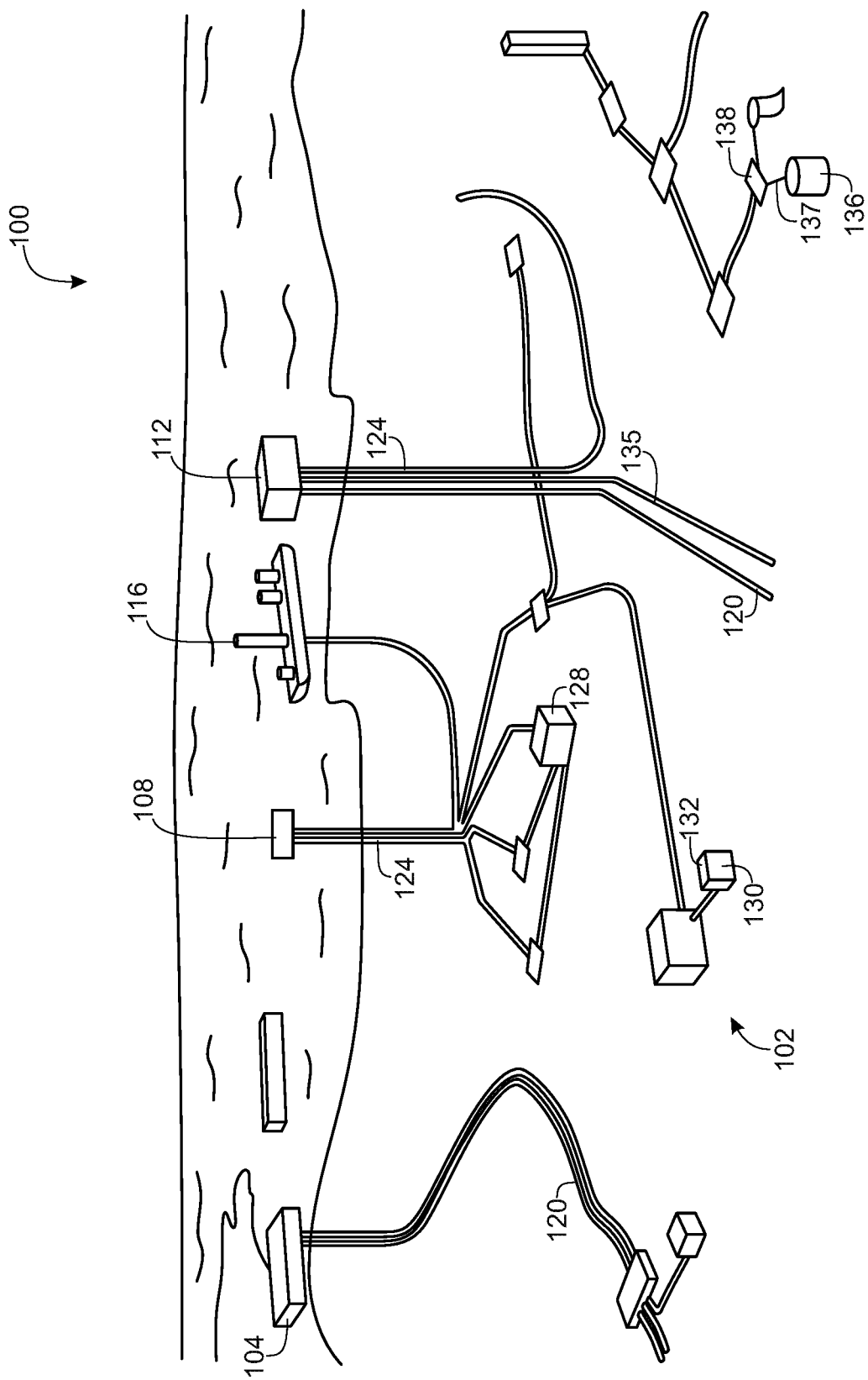
FIG. 1 depicts an example of an underwater environment in which systems and methods in accordance with embodiments of the present disclosure can be employed.

Embodiments of the present disclosure provide systems and methods that can be used in connection with the placement of objects in underwater environments. FIG. 1 depicts a drilling and production system 100, which is an example of an environment in which embodiments of the present disclosure can be employed. The drilling and production system 100 can include a variety of surface and subsea or underwater components or objects 102. As examples, and without limitation, these components or objects 102 can include processing platforms 104, jack-up platforms 108, floating platforms 112, pipelay or other surface vessels 116, pipelines 120, risers 124, manifolds 128, wells 130, touch down point 135, suction piles or anchors 136, chain 137, slip joints 138 and blowout preventers 132. As can be appreciated by one of skill in the art, it is advantageous to determine and to track the actual locations of the various components 102 of the system 100, of natural features, and of other objects in the vicinity of the system 100. In addition, components of the system 100 often need to be positioned with a high level of accuracy, to enable intended functions to be performed, to operatively connect to other components, and/or to avoid interfering with the operation of other underwater components.

Figure 2:
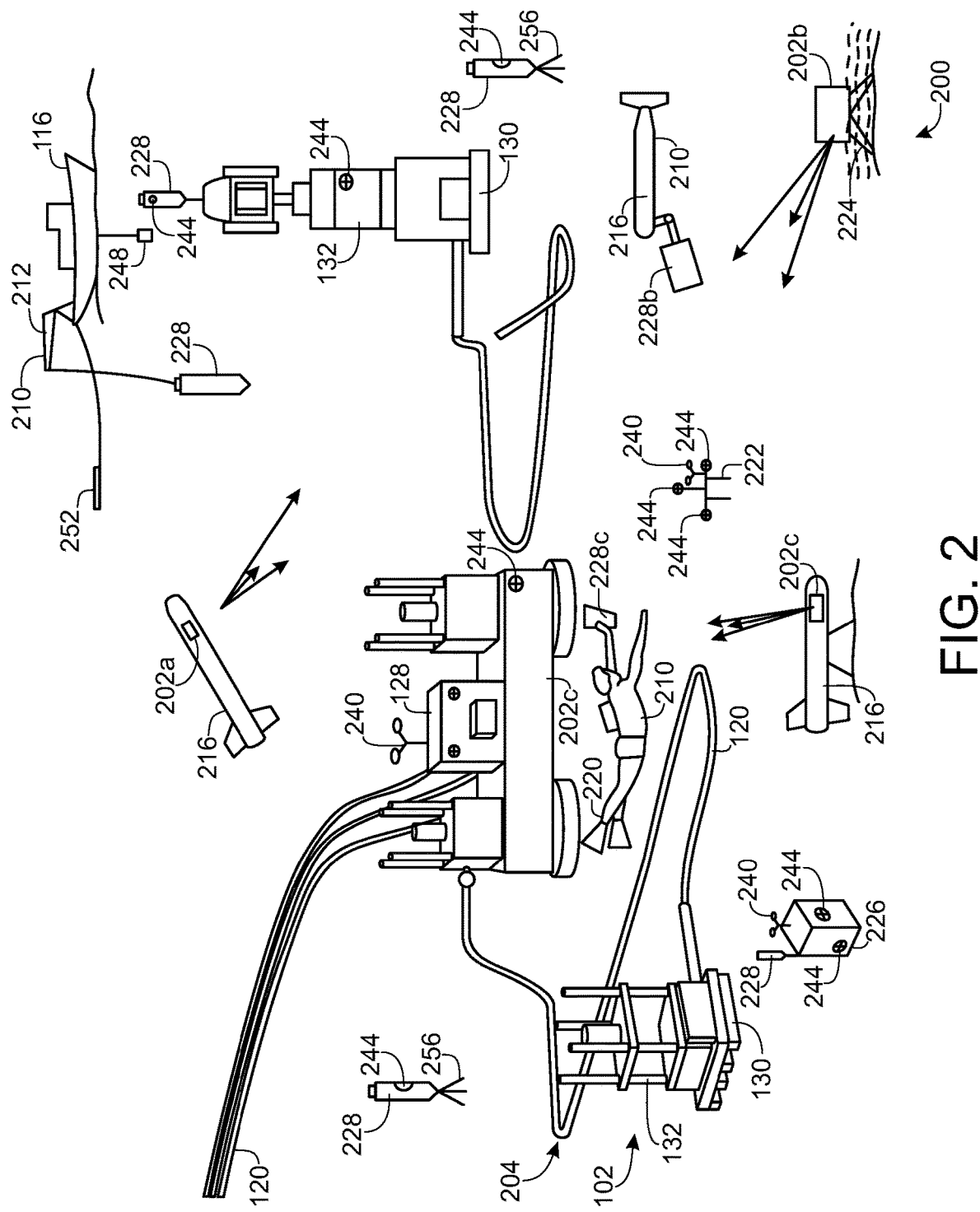
FIG. 2 depicts an underwater environment that includes a monitoring and metrology systems, monuments, and acoustic transponders in accordance with embodiments of the present disclosure.

FIG. 2 depicts an underwater environment that includes a combined optical and acoustical locating and positioning system 200, hereinafter referred to simply as the combined system 200, in accordance with embodiments of the present disclosure. The components of the combined system 200 can include one or more metrology systems 202, target stands 222, monuments 226, and acoustic transponders 228. In the example of FIG. 2, the underwater environment includes components of a drilling and production system as depicted in FIG. 1, however, embodiments of the present disclosure can be applied to any underwater environment or system. In accordance with embodiments of the present disclosure, the combined system 200 can employ the one or more metrology systems 202, target stands 222, monuments 226, and acoustic transponders 228 in various combinations to assist in locating natural features or manmade objects 102 within an underwater environment, as well as the other components of the combined system 200.

As depicted in the example scenario of FIG. 2, objects 102 within an underwater environment can include structures or other manmade objects that are stationary within or moving through the environment. Determining the actual locations of such objects 102, components of the combined system 200, and natural features within the environment is important to ensuring the safe and reliable operation of equipment, navigation of the environment, maintenance operations, the installation of additional objects, and the like. In accordance with embodiments of the present disclosure, the combined system 200 provides optical components, in combination with acoustical components to assist in locating and identifying objects 102 and components of the combined system 200 in an underwater environment. As examples, the optical components of a combined system 200 can include a metrology system 202 that utilizes optical instruments, including but not limited to active optical instruments, such as a light detection and ranging (lidar) system, optical targets 240 or 244, and visibly distinct features of underwater objects 102. Examples of acoustical components of a combined system 200 can include acoustic transceivers associated with a metrology system 202 or other component or object 102, hydrophones 248, hydrophone arrays 252, acoustic transponders 228, and acoustic transducers. In addition, a combined system 200 in accordance with embodiments of the present disclosure can include components that operate using a combination of methodologies. For example, as discussed in greater detail elsewhere herein, a metrology system 202 can include an active, optical system capable of measuring a frequency of a vibration of an acoustic transponder 228 emitting an acoustic signal.

The inclusion of optical metrology components within the combined system 200 can allow for the locations of objects 102, combined system 200 components, and natural features to be determined with a very high level of precision (e.g. millimeters). The inclusion of acoustical metrology components within the combined system 200 can allow for the locations of objects 102 and combined system 200 components to be determined in conditions in which optical techniques are compromised or unavailable, for example due to turbid water conditions. Moreover, the inclusion of optic-based and acoustic-based metrology systems provides redundancy, and enables operation in combination with a wider range of complementary systems. In addition, the combination of techniques allows improved location accuracy, and operation in a wider range of conditions.

As shown in the example scenario of FIG. 2, combined system 200 components, including but not limited to metrology systems 202, target stands 222, monuments 226, and acoustic transponders 228, can be positioned using various emplacing equipment 210. As examples, a combined system 200 component can be put into position by a crane 212, a submersible vehicle 216, or a diver 220. In each instance, the combined system component 200 can initially be placed at a location that is unknown or known approximately. The combined system 200 can then be operated to determine more accurate location information for the acoustic transponder 228. In addition, the combined system 200 can operate to assist in placing objects 102, and to determining a location of objects 102 within an environment with reference to previously located acoustic transducers 228, target stands 222, and monuments 226, as discussed in greater detail elsewhere herein.

A metrology system 202 in accordance with embodiments of the present disclosure is positioned within an underwater environment. The metrology system 202 can be mounted to a stationary platform or structure 224, or can be carried by a submersible vehicle 216. A metrology system 202 in accordance with embodiments of the present disclosure can include an active optical metrology system or instrument that uses light to determine the relative locations of objects 102, other metrology systems 202, target stands 222, monuments 226, acoustic transponders 228, and natural features in an underwater environment. As can be appreciated by one of skill in the art after consideration of the present disclosure, a metrology system 202 can determine an absolute or georeferenced location of an object 102, another component of the combined optical and acoustical positioning system, or a natural underwater feature where the metrology system 202 is itself georeferenced or has measured a relative location of an object 102 or other component of the combined system 200 that is georeferenced.

As can be appreciated by one of skill in the art, a metrology system 202 mounted to a stationary platform or structure 224 has an inherent conical field of regard. By incorporating a pan and tilt head in the metrology system 202, the field of regard can be increased to a full 360°, or even to over a hemisphere field of regard. As can further be appreciated by one of skill in the art after consideration of the present disclosure, a metrology system 202 can be mounted to a movable platform or vehicle 216, directly or via a pan and tilt head. As examples, but without limitation, a moveable platform or vehicle 216 can include a frame or cage that is moved by a crane, or a vehicle, such as but not limited to an autonomous underwater vehicle (AUV), a remotely operated vehicle (ROV), a submersible vehicle, or the like. Moreover, a moveable platform or vehicle 216 can be held stationary, for example by landing the platform or vehicle 216 on the seafloor or other structure, by clamping onto a structure, or by holding it in a hovering mode, while the metrology system 202 is in operation. As discussed in greater detail elsewhere herein, a monitoring system component of the metrology system 202 can be operated to scan all or portions of an underwater scene to determine location information.

The acoustic transponders 228 generally operate to provide output signals at acoustic frequencies. For example, an acoustic transponder 228 can generate an acoustic identification and ranging signal in response to receiving an acoustic interrogation signal. An acoustic transponder can additionally receive range information from another acoustic transponder 228. In at least some embodiments, an acoustic transponder 228 can also determine an approximate azimuth and elevation angle of an acoustic signal received from another acoustic transponder 228 or from an acoustic transceiver provided as part of a metrology system 202. The information regarding the relative range or bearing to another acoustic transponder 228 can all be provided by an interrogated acoustic transponder 228 in response to the interrogation signal. In accordance with still other embodiments of the present disclosure, an acoustic transponder 228 can store information regarding its location and can provide that information in response to an interrogation signal. These signals can be received by an acoustic transceiver, acoustic transducer, acoustic transponder 228, hydrophone 248, hydrophone array 252, or other sensor. An acoustic transponder 228 in accordance with embodiments of the present disclosure can include a visible target 240 or 244 or other indicia that can be used to uniquely identify individual acoustic transponders 228. Moreover, the visible target 240 or 244 can facilitate determining the location of the acoustic transponder 228 using optical metrology techniques. Accordingly, the location of an acoustic transponder 228 within an underwater environment can be determined by receiving optical signals from the acoustic transponder 228 in the form of reflected ambient or transmitted light. An acoustic transponder 228 can be mounted to a tripod 256, a structure or object 102 or 204, a target stand 222, a monument 226, a moveable platform or vehicle 216, or the like.

Target stands 222 and monuments 226 can be included as reference points. More particularly, target stands 222 and monuments 226 can include 3-D 240 and 2-D 244 targets that enable the location of a target stand 222 or monument 226 to be determined using optical metrology techniques. Additionally or alternatively, target stands 222 and monuments 226 can include acoustic transponders 228, to enable the location of a target stand 222 or monument 226 to be determined using acoustical metrology techniques. In addition, three-dimensional 240 and/or two-dimensional 244 targets can be fixed to various objects 102 in the underwater environment, such as components of a drilling and production system 100, for example, pipelines 120, risers 124, manifolds 128, wells 130, touch down point 135, anchors, suction piles, pin piles, blowout preventers 132, or other structures, target stands 222, monuments 226, stationary platforms 224, moveable platforms or vehicles 216, or any other underwater object. As discussed in greater detail elsewhere herein, these targets 240, 244 are specifically designed to provide control points within an image or within 3-D point cloud data produced by the monitoring system component of a metrology system 202. The inclusion of targets 240, 244 can facilitate the accurate determination of a target location within an underwater environment.

Figure 3:
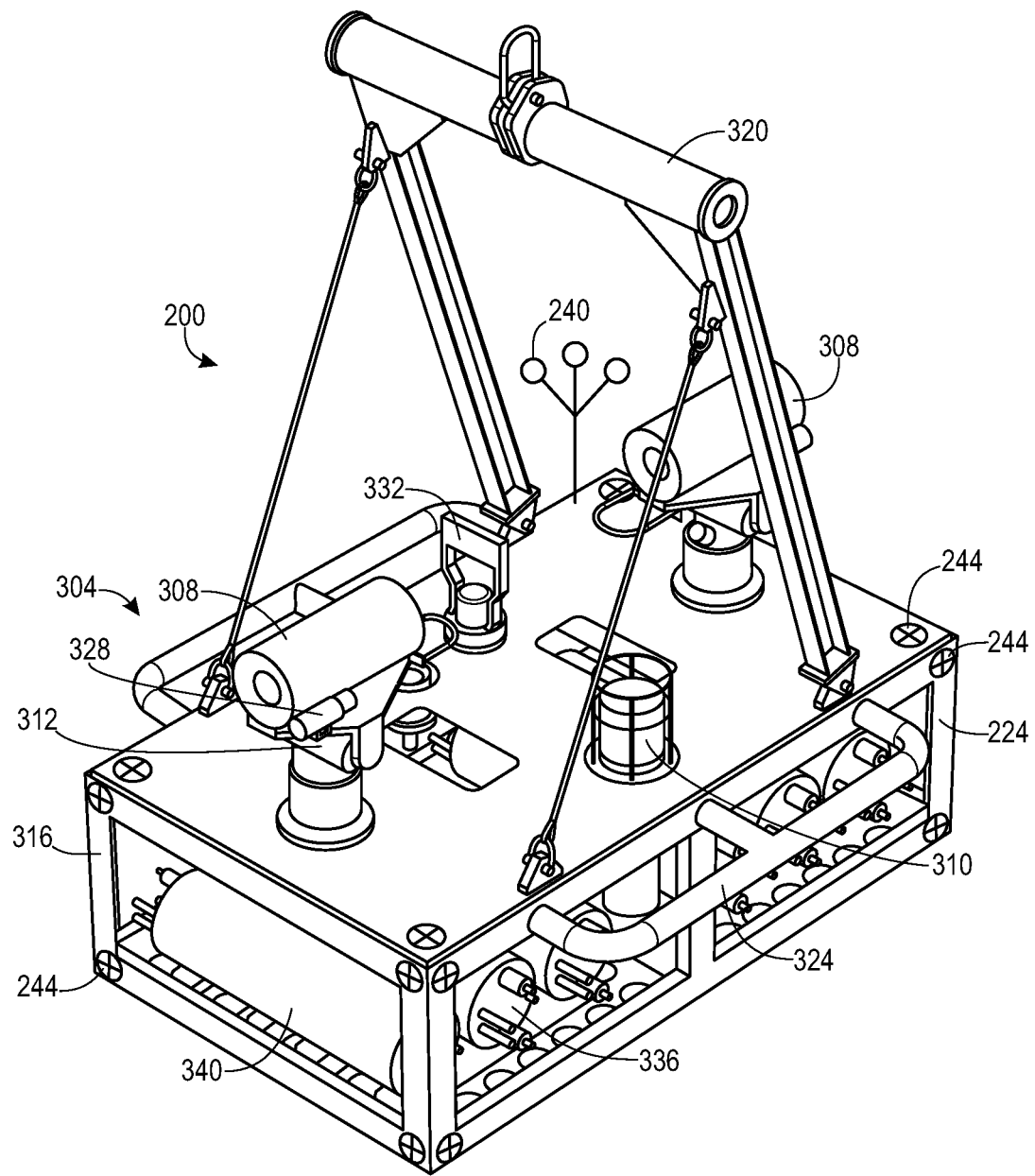
FIG. 3 depicts a metrology system in accordance with embodiments of the present disclosure.

FIG. 3 depicts a metrology system 202, mounted to a supporting structure 224, in accordance with at least some embodiments of the present disclosure. The metrology system 202 generally includes a monitoring system 304. The monitoring system 304 can comprise active, light based systems, such as one or more lidar devices 308, and one or more acoustic transceivers 310. In the illustrated example, the metrology system 202 includes two lidar devices 308, each of which is associated with a pan and tilt head 312 that can be operated to point the associated lidar device 308 along a selected line of sight. Alternatively or in addition to a lidar device 308, the metrology system 202 can include other optical metrology systems. An acoustic transceiver 310 can operate at acoustic frequencies, to enable the metrology system 202 to geo-spatially locate acoustic transponders 228 or other acoustic transceivers 310 using an acoustic metrology system. The acoustic metrology system can include, for example but without limitation, Ultra-Short Baseline (USBL), Long Baseline (LBL), untethered inverted USBL, or other acoustic metrology systems.

2-D targets 244 can be mounted to the frame 316 or other components of the monitoring system, and 3-D targets 240 can be mounted to the frame 316 or other components of the metrology system 202, to facilitate precisely locating the metrology system 202 within a field.

The supporting structure 224 can comprise a frame 316 that is in turn mounted to a stationary pad, a mud mat, another structure on the seabed, or placed directly on the seabed. The frame 316 can be designed to be lowered by a crane from the surface vessel or rig or can be designed to be deployed via an ROV. The frame 316 can be lowered using a crane lift 320. The lift 320 can be connected to the remainder of the frame 316 by a hinge so it lowers after deployment. This allows the lift 320 to drop out of the field of view of the lidar devices 308. The frame 316 can also include ROV manipulator handles 324 to facilitate positioning the frame 316 using an ROV or AUV. For example, the frame 316 can be placed on a monument 226 or other structure. The bottom of the frame 316 can have a pin or receptacle, so it can be lowered onto a mating receptacle or pin on a structure to enable precise location and alignment. In accordance with other embodiments of the present disclosure, the frame 316 may be carried by a vehicle, such as an ROV. In accordance with still other embodiments of the present disclosure, a metrology system 202 can be mounted to a vehicle via a pan and tilt head or can be mounted directly to a vehicle.

In at least some embodiments of the present disclosure, the metrology system 202 can itself comprise a subsea system with a platform with numerous selectable functions. In embodiments in which the metrology system 202 includes a support structure or frame 316 that holds multiple lidar devices 308, the lidar devices 308 and acoustic transceiver or transceivers 310 can be precisely located on the single structure so they create a single referenced point cloud. By mounting the lidar devices 308 on pan and tilt heads 312, they can provide hemispherical coverage. Cameras and lights 328 can be mounted on the support structure 316 or the pan and tilt heads 312 to enable the acquisition of visual data along with the lidar data. A hot stab 332 can be included to enable the metrology system 202 to connect to the local infrastructure for power and or communications. The metrology system 202 can further include one or more non-optical point sensors, such as a conductivity, temperature, and depth (CTD) device 336. Alternately or in addition, batteries and a power control system 340 can be included which allow for long-term autonomous deployment. The metrology system 202 can also provide additional capabilities including, but not limited to, data storage and backup, vibration sensors, turbidity sensors, various chemical sensors, and communication devices. The communication devices can include RF, optical, or acoustic devices. The communication devices can communicate with ROVs, AUVs, resident vehicles, other intelligent structures in the field, or systems on the surface. In accordance with still other embodiments the metrology system 202 can provide timing signals (if needed) between multiple sensors to time-synchronize the data collection of multiple sensors, such as from multiple lidar devices 308, and cameras 328, CTD 336, sonars, INU, and other devices. A single metrology system 202 can provide power, data storage, and communications for other metrology systems 200 or lidar devices 308, to support multiple monitoring points of view within an underwater environment.

Figure 4:
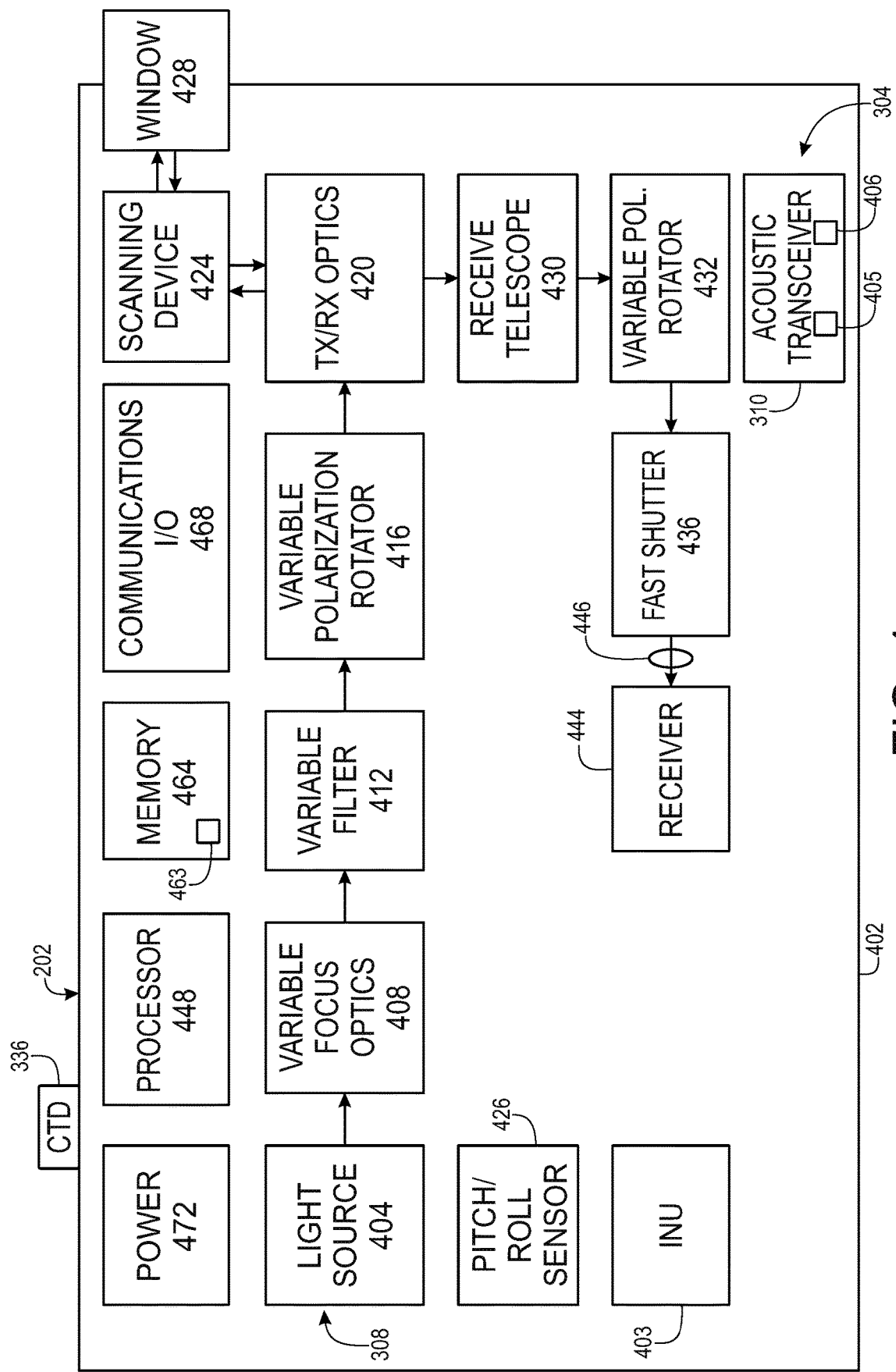
FIG. 4 is a block diagram depicting functional components of a metrology system in accordance with embodiments of the present disclosure.

FIG. 4 is a block diagram depicting components of a metrology system 202 that may be contained within an underwater pressure vessel 402 or co-located with one another in accordance with embodiments of the present disclosure. The metrology system 202 includes a monitoring system 304. The monitoring system 304 can include a lidar device 308 and an acoustic transceiver 310.

As can be appreciated by one of skill in the art after consideration of the present disclosure, a lidar device 308 is an active optical system that operates by transmitting light towards a target, receiving reflected light from the target, and determining the range to the target based upon time of flight information determined from the amount of time elapsed between the transmission of light from the light source and the time at which the reflected light or return signal is received at a receiver. As used herein, a target can include an area or feature on the sea floor, an object 102, or any other underwater structure or feature, including manmade structures and natural features or structures, 3-D targets 240 mounted to an underwater structure or device, or placed on the sea floor, and 2-D targets 244 applied to an underwater structure or device, or placed on the sea floor. In addition, the location of a point on the target from which light is reflected can be located relative to the lidar device 308 in three-dimensional space by combining the range information with the known azimuth and elevation information via scanner location (e.g. as an azimuth angle and an elevation angle) for scanning lidar devices 308, pixel location for multi-pixel lidar devices 308, or a combination of the two. The fourth dimension, time, is also recorded so measurements and features can be compared over time. As can be appreciated by one of skill in the art after consideration of the present disclosure, the lidar device 308 enables the metrology system 202 to determine the locations of objects 102 relative to the metrology system 202, or relative to objects within the field of regard of the lidar device 308, or that otherwise have a known relative location, using signals at optical frequencies. Moreover, where a reference target 240, 244, monument 226, or other object within the field of regard of the lidar device 308 has a known absolute location, the lidar device 308 can determine the absolute location of the metrology system 202 itself and of the objects 102 within its field of regard of the metrology system 202.

As can also be appreciated by one of skill in the art after consideration of the present disclosure, an acoustic transceiver 310 is an acoustic system that can include active and passive acoustic components. The active components can provide an acoustic signal that identifies the associated metrology system 202, provides information that allows an acoustic transceiver provided as part of another instrument or device to determine a relative range and bearing to the emitting acoustic transceiver 310, provides interrogation signals to specific acoustic transponders 228, performs an acoustic modem function, for example to transmit location information to an acoustic transponder 228, and/or the like. The passive components can receive acoustic signals from acoustic emitters provided as part of another instrument or device. Accordingly, the acoustic transceiver enables the metrology system 202 to identify and to determine the location of acoustic emitters relative to the metrology system 202. Where an acoustic transponder 228 or other acoustical emitter has a known absolute location, the acoustic transceiver 310 can determine the absolute location of the metrology system 202 itself and of other acoustic emitters from which the acoustic transponder 228 receives a signal. Moreover, as discussed in greater detail elsewhere herein, a metrology system 202 can use optical and acoustic signals in combination to locate objects 102 in an underwater environment accurately and in a wide variety of conditions.

A metrology system 202 can also include a navigation system, such as an Inertial Navigation Unit (INU) 403, which can be used to provide information regarding the location of the metrology system 202, and in turn of objects 102 within the field of regard of the lidar device 308 or objects 102 from which an acoustic locating signal is received by the acoustic transceiver 310. The INU 403 can be used independently or in conjunction with other metrology systems, including light and acoustic metrology systems, such as acoustic beacons, super-short baseline (SSBL) systems, ultra-short baseline (USBL) systems, untethered inverted USBL systems, or long baseline (LBL) systems.

The components of the lidar device 308 provided as part of a metrology system 202 include a light source 404. The light produced by the light source 404 can be collimated or variably focused by optics 408. In accordance with at least some embodiments of the present disclosure, the light source 404 is a pulsed beam laser. As can be appreciated by one of skill in the art after consideration of the present disclosure, the light source 404 can produce light having a selected wavelength or range of wavelengths. As an example, but without limitation, the light source 404 may comprise a blue-green laser light source. As a further example, the light source 404 may have an output centered at 532 nm. Other wavelengths can also be used, for example to optimize performance in response to various water conditions. In accordance with still other embodiments, the light source 404 may produce non-collimated light. In accordance with still other embodiments, the light source 404 may be light emitting diode (LED) based, continuous wave (CW) laser based, modulated CW based, structured light, or some other light source.

The variable focus optics 408 can include traditional mechanical focusing elements, or non-mechanical elements, such as may be provided by fluid lenses, liquid crystal devices, electro-optic devices, and other optical elements. The ability to focus the beam can be used to optimize signal return for a specific target at a specific range for specific water conditions. The light can then be adjusted in magnitude by a variable filter or attenuator 412. This is advantageous for underwater sensing as the attenuation of seawater or other water bodies can vary dramatically, thus dramatically changing the return signal, which can strain the dynamic range of the receiver. One method for reducing the required dynamic range of the receiver is to adjust the light output power from the transmitter. This can be achieved by the variable attenuator 412. As examples, the variable attenuator 412 can include standard neutral density filters, other attenuation filters, or polarization elements.

The optical train can also include a variable polarization rotator 416. It is known that the polarization of the transmitted light can affect the backscatter power, which is a source of noise at the lidar device 308 receiver. Transmission range can therefore be optimized by adjusting the polarization rotation of the output light. The variable polarization rotator 416 can impart any polarization to the output light.

Transmit and receive (Tx/Rx) optics 420 are used to make the sensor monostatic. Monostatic sensors have the distinct advantage of simplified scanning as the transmitter and receiver are pointed at the same location with the same scanning mechanism, resulting in calibration and reliability performance that is superior to bistatic systems. A scanning device 424 can then be used to accurately direct the transmitted beam and the field of view of the receiver simultaneously to a scene through a window 428 in the enclosure 402. The scanning device 424 can include a steering mirror or other beam steering device, such as a micro-electromechanical system (MEMs), liquid crystal, acousto-optic, or electro-optic device, for precise control of the pointing of the light source and receiver toward a target location 202, such as an underwater structure, and at known angles relative to the metrology system 202.

Light reflected from the target is received by the scanning device 424 and is split by a beam splitter element included in the Tx/Rx optics 420. Light from the Tx/Rx optics 420 is provided to a receive telescope 430, which is configured to focus the received light so that it can be imaged onto the sensor elements of a receiver 444 included in the metrology system 202. In a different embodiment the receive telescope 430 collimates the light and it is then focused by focusing optic 446. A variable polarization rotator 432 can be included to optimize the signal-to-noise ratio (SNR) of the return signal by selecting the optimal polarization for the hard target return.

A fast shutter 436 is provided to block any stray light from the primary beam as it exits the window 428, after being directed by the scanning device 424. The fast shutter 436 is timed with high speed electronics, which may be implemented by a processor 448, to block the window 428 reflection from a transmitted pulse and then open quickly to capture returns from close targets. Light passed by the fast shutter 436 is then provided to the receiver 444. The receiver 444 detects the light reflected from a target, and timing and intensity information regarding the received signal is used to create 3-D point cloud data. The receiver 444 thus is an optical sensor or detector, such as a photodiode, an avalanche photodiode, a photomultiplier tube, a silicon photomultiplier tube, a Geiger mode avalanche photodiode, charge coupled device (CCD) detector, complementary metal oxide semiconductor (CMOS) detector, or other optical detector. It can also include an electronic amplifier and/or thermal control elements and circuitry. In addition, the receiver 444 can include or be associated with a narrow band filter to reduce background light. A focusing optic 446 can be included to focus received light onto the sensor of the receiver 444. In accordance with embodiments of the present disclosure, the receiver 444 may comprise a single or multiple pixel sensor. Information regarding the range to the target is monitored by a processor 448, which controls and/or has access to information regarding the time at which transmitted light is output, and the time at which a return signal, comprising transmitted light that has been reflected from a target, is received by the receiver 444. In addition, information from the scanning device 424, from a pan and tilt head 312, from a pitch and roll sensor 426 mounted to the pan and tilt head 312 or included in the lidar device 308, and/or the location of a receiving pixel in a lidar device 308 having a multiple pixel sensor as the receiver 444 can be used by the processor 448 to determine the azimuth angle and elevation angle to the target. This information can then be combined with timing information, and in particular the time at which the transmitted pulse of light produced by the light source 404 is sent towards the target, and the time that the return signal is received at the receiver 444. The range measurement determined from the timing information can then be applied to obtain a location of the target relative to the metrology system 202. The pitch and roll sensor or similar device can be used to provide the gravity vector of the point cloud. This can then be used to orient the point cloud in relation to gravity, thus in effect "leveling" the system.

The acoustic transceiver 310 generally includes an acoustic output or transmitter 405 and an acoustic input or receiver 406. As examples, but without limitation, the acoustic transmitter 405 may comprise an acoustic transducer or set of transducers that operate to transform electrical signals into acoustic signals having a selected frequency or frequencies, and to transmit that frequency or set of frequencies through the water surrounding the metrology system 202. Moreover, a signal output by the acoustic transmitter 405 can be encoded, for example to address a specific acoustic transponder 228 or set of transponders 228, or to signal an acoustic transponder 228 to output a reply or identification signal, to transmit location information for an acoustic transponder 228 or to another combined system 200 component, or to otherwise perform an acoustic modem function. The acoustic receiver 406 may comprise a hydrophone or set of hydrophones that operate to receive acoustic signals from the water surrounding the metrology system 202 and to transform those signals into electrical signals. As discussed in greater detail elsewhere herein, received acoustical signals can include identification, acknowledgement, ranging, communication, or other signals. The acoustic transceiver 310 can be inside the same enclosure 402 or can be outside enclosure 402 and contained within its own enclosure, which is generally a pressure housing.

The processor 448 can include any processor capable of performing or executing instructions encoded in system software or firmware 463 stored in data storage or memory 464, such as a general purpose programmable processor, controller, Application Specific Integrated Circuit (ASIC), Field Programmable Gate Array (FPGA), or the like. Moreover, the execution of that software or firmware 463 can control the operation of the metrology system 202.

With respect to the lidar system 308, operation of the metrology system 202 can include the acquisition of point cloud data that includes azimuth angle, elevation angle, intensity, and range information taken from an underwater scene comprising the area surrounding the metrology system 202, and can further include the identification of objects 102, targets 240 and 244, and the like within the scene. With respect to the acoustic transceiver 310, operation of the metrology system 202 can include the interrogation of acoustic transponders 228 within the scene comprising the area surrounding the metrology system 202, the acquisition of identification, range, bearing or other information, or other operations.

In accordance with embodiments of the present disclosure, the information from or about objects 102 within a scene can be obtained using both optical and acoustical methodologies, and used selectively or in combination by the metrology system 202 to identify objects within a scene and determine the relative locations of the objects 102. Moreover, where absolute or georeferenced location information is available for the metrology system or an object 102, a metrology system 202 in accordance with embodiments of the present disclosure can operate by using optical and acoustical methodologies alone or in combination to georeference some or all of the objects 102 within the scene. Moreover, the identification and locating of objects 102 within the scene using one or more of the methodologies available to the metrology system 202 can be performed through operation of the software 463 stored in the memory 464 and executed by the processor 448 provided as part of the metrology system. In accordance with still other embodiments of the present disclosure, the metrology system 202 can report data regarding the identities and locations of objects 102 within a scene, and can exchange information with other metrology systems 202, to exchange information with a user interface, server system, or other computing node in communication with the metrology system, or the like.

Different operations of the software 463 can be distributed amongst different programs, applications, or software modules. In general, the execution of the software 463 by the processor 448 can be performed in conjunction with the memory 464. Moreover, the function of the memory 464 can include the short or long-term storage of timing information, range information, point cloud data generated by the lidar system 308, control point locations, or other control information or generated data. The memory 464 can comprise a solid-state memory, hard disk drive, a combination of memory devices, or the like.

The metrology system 202 can additionally include various sensors, in addition to those included in the lidar system 308 and the acoustic transceiver 310. For example, the metrology system 202 can include a CTD device 336 for measuring the conductivity (and thus the salinity), the temperature, and the depth of the water at the location of the metrology system 202. Because a CTD device 336 must be in direct contact with the surrounding water, it can be mounted outside of or adjacent an aperture in the enclosure 402.

Embodiments of the present disclosure can include all of the components illustrated in FIG. 4, additional or alternate components, or a subset of these components. In accordance with embodiments of the present disclosure, the range and angle measurements made by the lidar system 308 should all be compensated using techniques described in U.S. Pat. Nos. 8,184,276 and 8,467,044. The memory 464 can be used for storing the location information, operating instructions, generated data, and the like. An input/output or communication interface 468 can be included for transmitting determined information to a monitoring and control station 804 (see FIG. 8) or other system or control center in real-time, near real-time, or asynchronously. A power source and distribution bus 472 can also be integrated with the metrology system 202. Various elements of a metrology system 202 as disclosed herein can be provided as or by discrete or integrated components. For example, various optical elements of the lidar system 308 can be formed on a substrate that is bonded to the semiconductor substrate in which the receiver 444 is formed, creating an integrated chip or package.

Figure 5A:
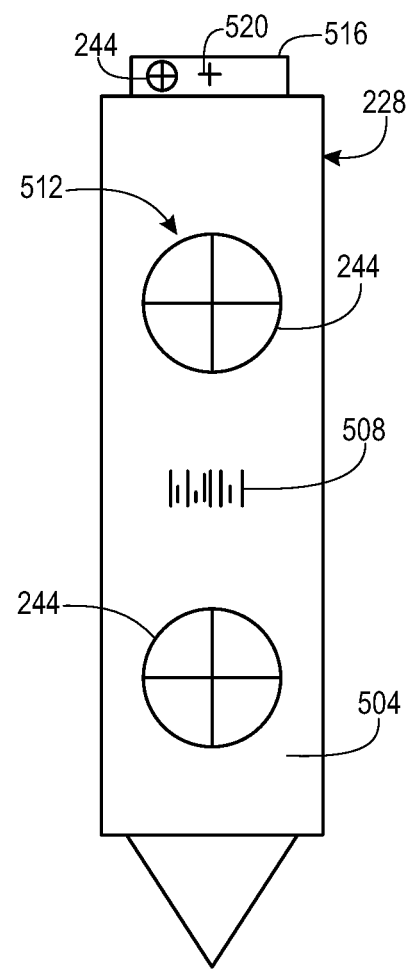
FIGS. 5A-5B depict acoustic transponders in accordance with embodiments of the present disclosure.

FIG. 5A depicts an acoustic transponder 228 in accordance with embodiments of the present disclosure. As shown in the figures, an acoustic transponder 228 as disclosed herein generally includes a water tight body or housing 504 to which one or more 2-D targets 244, identifying codes, letters, or numerals 508, or other indicia 512 have been applied. In addition, the acoustic transponder 228 includes an acoustic transducer 516. As can be appreciated by one of skill in the art, the acoustic transducer 516 is located so that it is in contact with the surrounding water when the acoustic transponder 228 is in place in an underwater location. As described in greater detail elsewhere herein, the indicia 512 can be configured to uniquely identify an associated acoustic transponder 228, and to assist in precisely locating a reference point 520, such as a physical center point, of the acoustic transducer 516 using optical instruments, such as a lidar system 308 included as part of a metrology system 202 as disclosed herein. In accordance with still further embodiments of the present disclosure, the indicia 512 can include a 2-D target 244 that is applied directly to the surface of the acoustic transducer 516. Accordingly, instead of the generally poorly reflective, rubber or other pliable surface of the typical acoustic transducer 516, a highly reflective target 244 can be applied to a portion of that surface, facilitating the identification of the location of the acoustic transducer 516 using a lidar device 308 or other optical system.

Figure 5B:
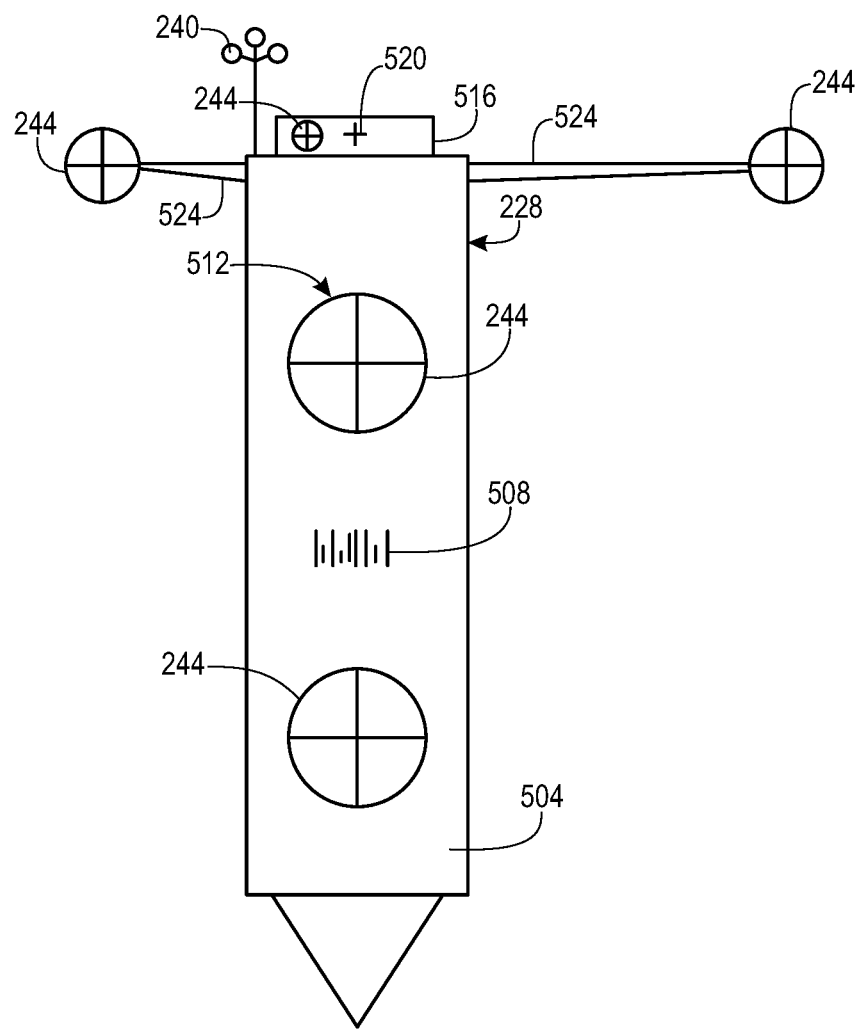

In the embodiment depicted in FIG. 5A, the targets 244 are applied directly to the housing 504. As depicted in FIG. 5B, targets 244 can be held on arms 524 that extend from the housing 504, as well as or in place of targets 244 applied to the housing 504. Alternatively or in addition, a 3-D target 240 can be fixed to the housing 504. As can be appreciated by one of skill in the art after consideration of the present disclosure, the inclusion of one or more 3-D targets 240 and/or of one or more targets 244 held on arms 524 allows the targets 240 or 244 to be positioned at greater distances from one another, thereby increasing the ability of the metrology system 202 to identify the location of the center point 520 of the acoustic transducer 516 included in the associated acoustic transponder 228. The additional targets 240 and/or 244 included on the arms 524 can also provide more control points in different orientations and planes for transponder 228 than can be provided on the housing 504 itself. In accordance with still other embodiments, an acoustic transponder 228 can be fixed to a target stand 222 and can be located precisely with reference to targets 240 or 244 also fixed to the target stand 222. A target 244 can also be placed directly on the acoustic transducer 516 at a location corresponding to the center point 520 of the acoustic transducer 516.

All reference indicia 512 and optical targets 240 and/or 244 can be measured with high accuracy in 3D space at the surface (in air) relative to the center or reference point 520. These dimensional control (DC) offsets can then be used to identify the location of the reference point 520 underwater with high accuracy based upon reference indicia 512 and the targets 244 or 240. Identifying codes, letters, or numerals 508 can include a bar code type system that the lidar device 308 or other optical system automatically reads. The system can then use a database or other method to identify the unique transponder 228 and acquire the DC offsets or other metadata for the uniquely identified transponder 228 from the database. In addition, to the DC offsets, the metadata can include hub number, date of installation, acoustic identification code, or any other information associated with the transponder 228. This reduces the need for ROV video identification.

Figure 6:
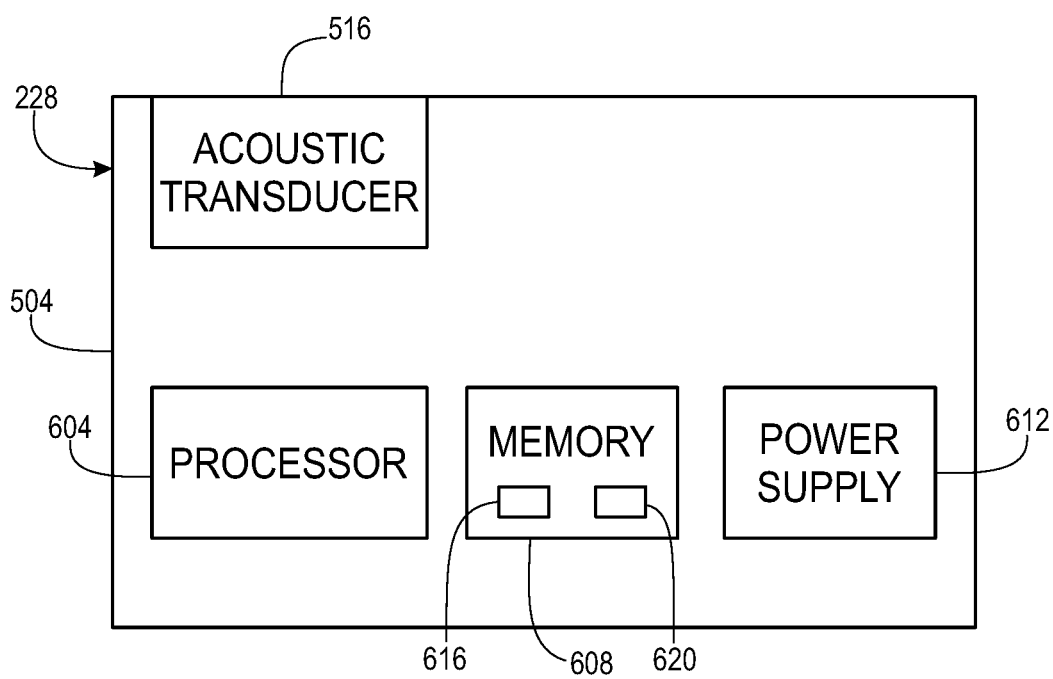
FIG. 6 is a block diagram depicting functional components of an acoustic transponder in accordance with embodiments of the present disclosure.

FIG. 6 is a block diagram depicting components of the acoustic transponder 228 of FIGS. 5A-5B. These components generally include the housing 504, the acoustic transducer 516, a processor 604, memory 608, and a power supply 612. Note that the acoustic transducer 516 can be a single transducer or an array of individual transducers, where the array allows for direction finding. The processor 604 may comprise a general purpose programmable processor or controller that is capable of executing software or firmware, such as, but not limited to, an application 616 stored in memory 608. The application 616 may comprise instructions controlling the operation of the acoustic transponder 228, such as identifying acoustic interrogation signals that are received at the acoustic transducer 516 and are addressed to or that otherwise require a response or other action by the acoustic transponder 228. The application 616 can further operate to cause the acoustic transducer 516 to output an acoustic identification, ranging, direction, or other signal, for example periodically or in response to an interrogation signal. In addition to an application 616, the memory 608 of the acoustic transponder 228 can store identification codes, ranging sequences, or other data 620. An acoustic transponder 228 in accordance with still other embodiments of the present disclosure can operate to store information in memory 608 regarding the location of the acoustic transponder 228, for example that has been communicated to the acoustic transponder 228 as part of an acoustic information signal provided by a metrology system 202 that has determined that location information. In such embodiments, the acoustic transponder 228 may further operate to transmit its location information to other acoustic transponders 228, to acoustic transceivers 310, or other devices. An acoustic transponder 228 can additionally implement an acoustical modem function to send, relay, or receive information encoded on acoustic carrier frequencies.

Figure 7:
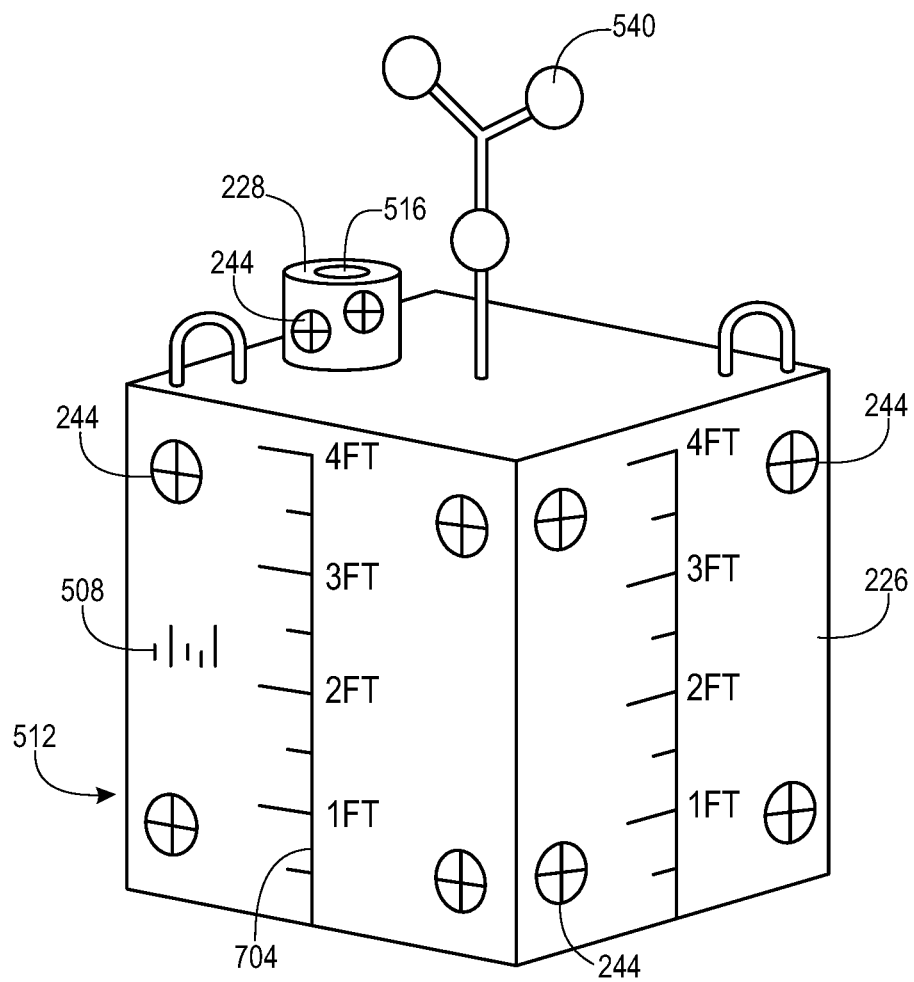
FIG. 7 depicts a monument in accordance with embodiments of the present disclosure.

FIG. 7 depicts a monument 226 that can be used in connection with determining locations of objects 102 and underwater features as part of a combined system 200 as described herein. The monument 226 features three-dimensional 240 and/or two-dimensional 244 targets. In accordance with further embodiments, the monument 226 can include additional or reference indicia 512, such as scales 704, identifying codes, letters, or numerals 508, or the like. Such indicia 512 can assist in visually identifying the monument 226 and the relative location of the monument 226, for example using a lidar 308 provided as part of a metrology system 202. A monument 226 can therefore provide a reference point with respect to which the relative location of an underwater structure or object 102, target stands 222, acoustic transducers 228, and/or the metrology system 202 itself can be determined and monitored. In accordance with still further embodiments of the present disclosure, the monument 226 can include an acoustic transponder 228 to enable the acoustic validation of the location of the monument 226, and to provide acoustic relative location data. The acoustic transponder 228 can include targets 244 or other indicia 512, an acoustic transducer 516, and other components included in an acoustic transponder 228 generally. Moreover, the acoustic transponder 228 can receive and store information regarding the location of the acoustic transponder 228 and/or the associated monument 226, and can communicate that information to other combined system 200 components, such as other acoustic transducers 228 and acoustic transceiver 310 components of metrology systems 202. The inclusion of an acoustic transponder 228 as part of or mounted to a monument 226 therefore allows for an independent location validation measurement using a different measurement mechanism (acoustic versus optical). Accordingly, one or more monuments 226 can be positioned within a scene to provide fixed reference points that can be accurately identified by the metrology system 202 and that can be used as reference points to determine the location of underwater structures 102, acoustic transponders 228, metrology systems 202, or other objects within the underwater scene relative to the monuments 226.

Figure 8:
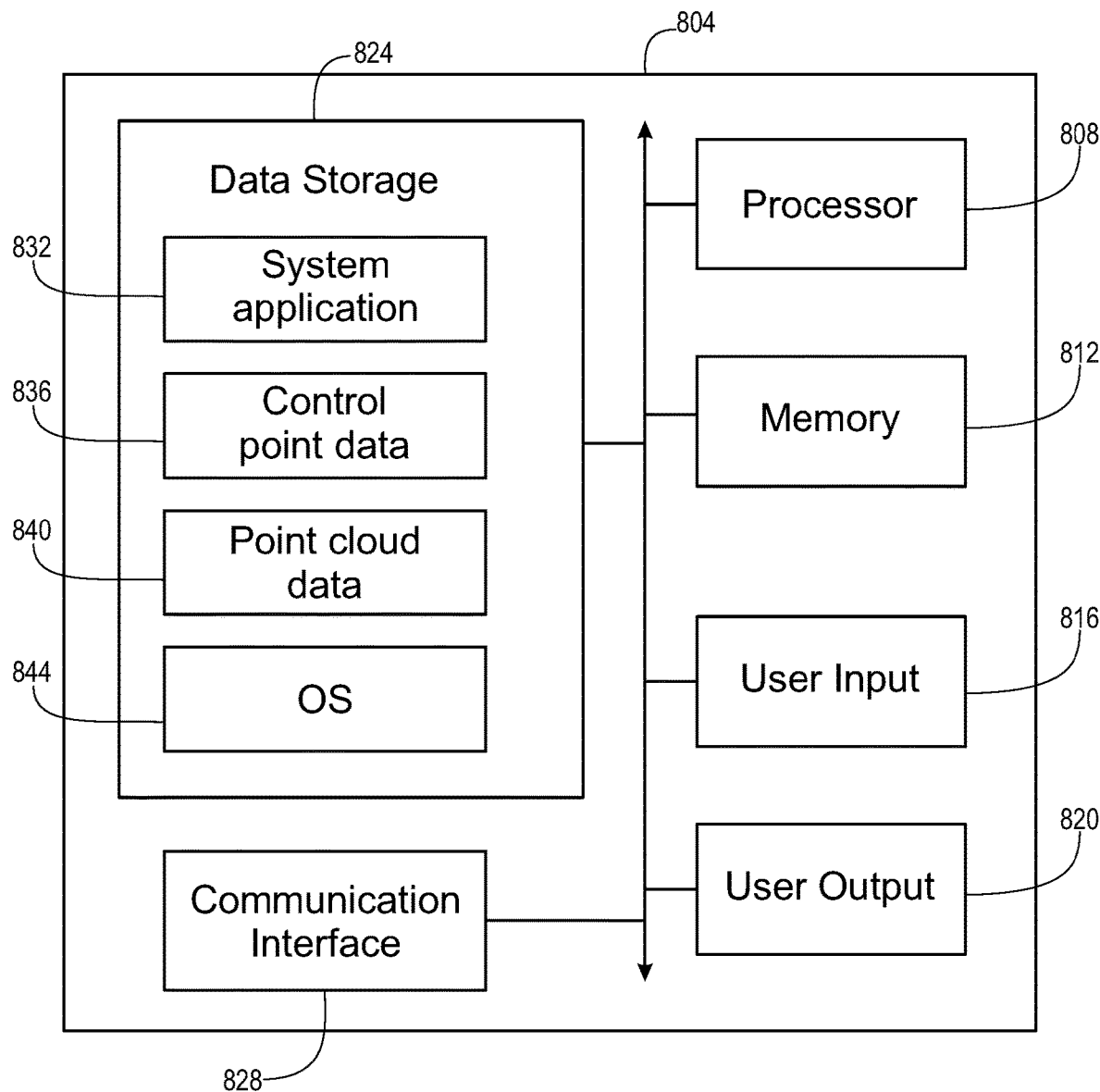
FIG. 8 is a block diagram depicting a monitoring and control station in accordance with embodiments of the present disclosure.

FIG. 8 is a block diagram depicting human interface and other components that can be provided as part of or in conjunction with a monitoring and control station 804 associated with a combined system 200 in accordance with embodiments of the present disclosure. The monitoring and control station 804 can be provided as a top-side facility, carried by a mobile platform, such as a surface ship or a submersible vehicle, mounted to a fixed or stationary platform, such as a production platform, or located at an on-shore facility. The monitoring and control station 804 facilitates or performs functions that include providing output to and receiving input from a user or from an automated processing center. The monitoring and control station 804 generally includes a processor 808 and memory 812. In addition, the monitoring and control station 804 can include one or more user input devices 816 and one or more user output devices 820. The monitoring and control station 804 also generally includes data storage 824. In addition, a communication interface 828 can be provided, to support interconnection of the monitoring and control station 804 to the underwater components of the combined system 200, and/or to other systems. This interface can be used as a command and control interface to another autonomous device that provides the inputs and reads outputs that replaces human user interfaces 816 and 820.

The processor 808 may include a general purpose programmable processor or any other processor capable of performing or executing instructions encoded in software or firmware. In accordance with other embodiments of the present disclosure, the processor 808 may comprise a controller, FPGA, or ASIC capable of performing instructions encoded in logic circuits. The memory 812 may be used to store programs and/or data, for example in connection with the execution of code or instructions by the processor 808. As examples, the memory 812 may comprise RAM, SDRAM, or other solid-state memory. In general, a user input device 816 is included as part of the monitoring and control station 804 that allows a user to input commands, including commands that are transmitted to the underwater components of the combined system 200, and to control aspects of the operation of the metrology system 202. Examples of user input devices 816 that can be provided as part of the monitoring and control station 804 include a keyboard, keypad, microphone, biometric input device, touch screen, joy stick, mouse, or other position encoding device, or the like. A user output device 820 can, for example, include a display, speaker, indicator lamp, or the like. Moreover, a user input device 816 and a user output device 520 can be integrated, for example through a graphical user interface with a pointing device controlled cursor or a touchscreen display. Like the memory 812, the data storage 824 may comprise a solid-state device. Alternatively or in addition, the data storage 824 may comprise, but is not limited to, a hard disk drive, a tape drive, or other addressable storage device or set of devices. Moreover, the data storage 824 can be provided as an integral component of the monitoring and control station 804, or as an interconnected data storage device or system.

The data storage 824 may provide storage for a subsea monitoring system application 832 that operates to present a graphical user interface through the user output device 820, and that presents a map or other representation of the locations of objects 102, metrology systems 202, target stands 222, monuments 226, acoustic transponders 228, and/or other objects in an underwater environment. The presentation can further depict any differences between the location of an object 102 as determined using a lidar device 308 and a location as determined by an acoustic transceiver 310. For instance, as an optically determined location, when available, is typically more precise than an acoustically determined location, a location as determined by the optical system can be represented as a point on a map of the seafloor, while the location as determined by the acoustical system can be represented by an area on the map. This can include visual representation of measurement uncertainty, or error bars, of each measurement system. The output device 820 can further provide a view of point cloud data 840, or data derived from point cloud data, obtained by a metrology system 202. The application 832 can further operate to receive control commands from a user through the user input device 816, including commands selecting target areas or specific targets within an underwater scene from which 3-D point cloud data should be obtained by the metrology system 202. Moreover, the application 832 can operate to receive control commands regarding acoustic transponders 228 that should be interrogated, and from which location information should be collected. In accordance with embodiments of the present disclosure, the application 832 can perform various functions autonomously, such as identifying underwater objects 102, such as target stands 222, monuments 226, acoustic transponders 228, identifying features on underwater objects 102, identifying a centroid of an underwater object or a feature of an underwater object, identifying control points on underwater objects, identifying target 240 or 244 centroids, monitoring the motion, and/or vibration of underwater objects, or other operations. Such automated operations can be implemented using, for example, image recognition techniques. The data storage 824 can additionally provide storage for the identified locations of underwater objects 102, control point data 836, point cloud data 840, maps of underwater features, identifiers of underwater features, indicia 512 and identification codes of acoustic transponders 228, and the like. In accordance with still other embodiments of the present disclosure, the system application 832 can be executed to operate a metrology system 202 to detect motion, vibration, vibration mode, changes, features, lack of features, other anomalies, temperatures, or leaks instead of or in conjunction with execution of the system software 463 by the processor 448 of the metrology system 202. The data storage 824 can also store operating system software 844, and other applications or data.

Figure 9:
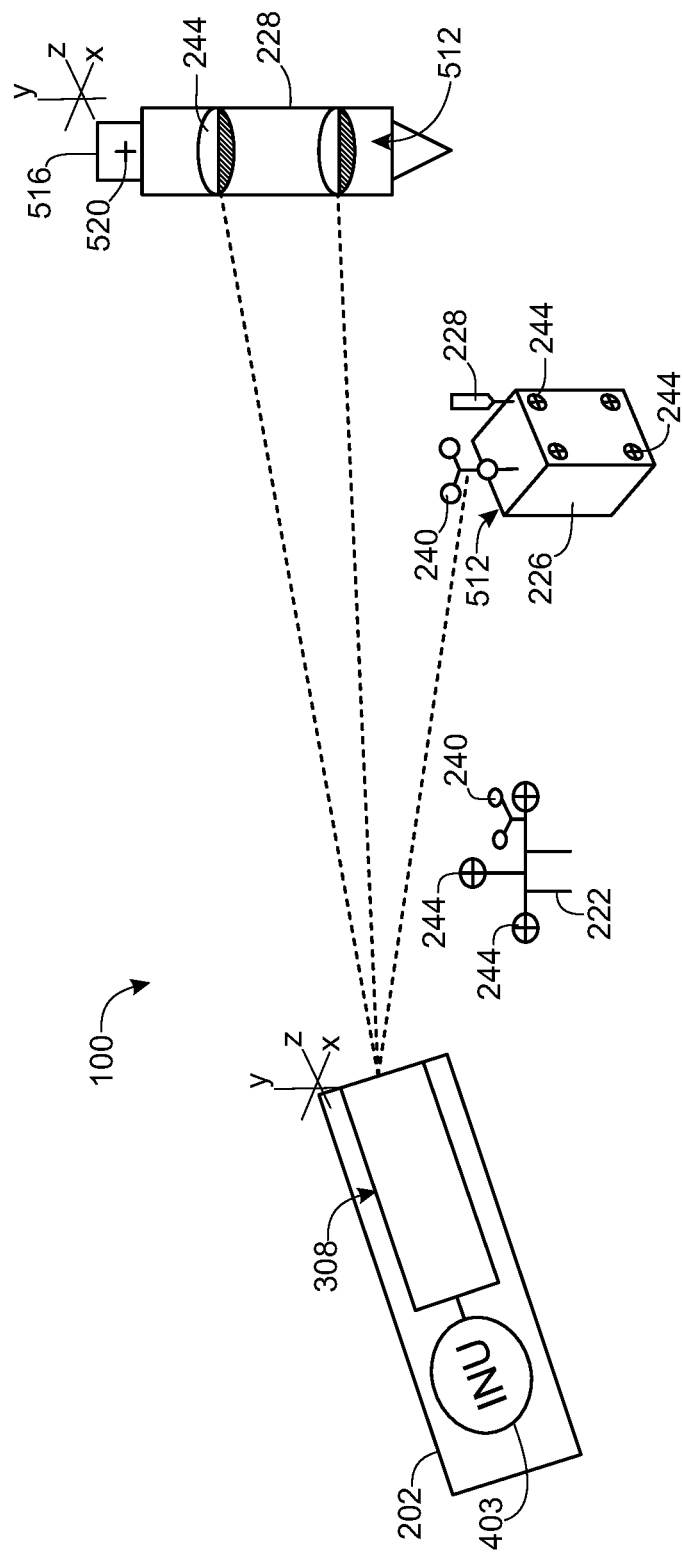
FIG. 9 depicts an undersea scenario including the use of an acoustic transponder and a geo-located monument in accordance with embodiments of the present disclosure.
Figure 10:
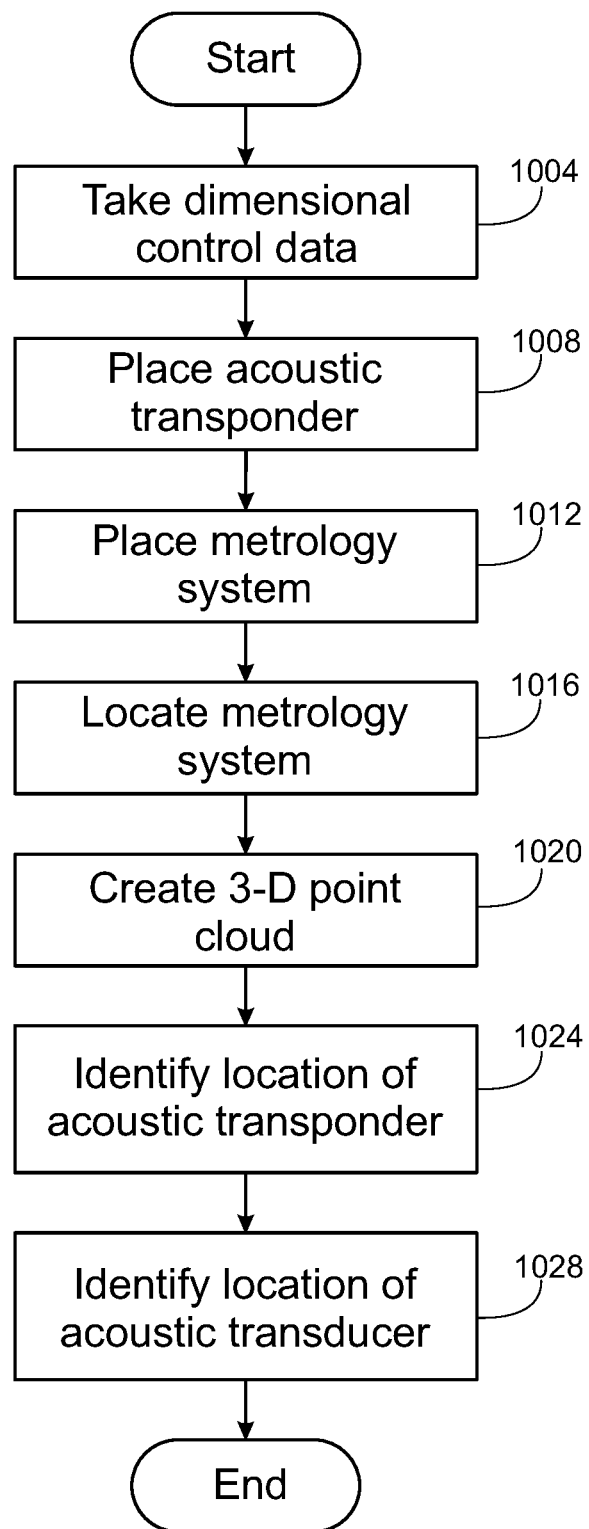
FIG. 10 is a flowchart depicting aspects of a method of operating a combined system in accordance with embodiments of the present disclosure.

FIG. 9 depicts an undersea scenario including the use of an acoustic transponder 228 in accordance with embodiments of the present disclosure. FIG. 10 is a flowchart depicting aspects of a process that can be performed in connection with a scenario such as the one illustrated in FIG. 9. The first step, which is performed at the surface, is to take Dimensional Control (DC) data for the acoustic transponder 228 (step 1004). This entails taking highly accurate measurements from the actual acoustic element 516 of the transponder 228 to the multiple indicia 512 in 3D space (X, Y, Z coordinates). Highly accurate measurement can be performed using a Total Station or a Coordinate Measuring Machine (CMM). Less accurate measurements can be achieved with a tape measure or similar device. The measurement can locate a centroid or defined center point 520 of the acoustic transducer 516 relative to the indicia 512. With this information the metrology system 202 can accurately locate indicia 512 in 3-D space and then use the DC offsets to compute the location of the center 520 of the acoustic transducer 516. In accordance with further embodiments of the present disclosure, the indicia 512 can include information uniquely identifying an associated acoustic transponder 228. In this manner the unique offsets for each transponder can be applied.

The acoustic transponder 228 is then lowered and placed in the field 100 at an approximately known location (step 1008). The metrology system 202 is also lowered and placed in the field 100 at an approximately known location (step 1012). The metrology system 202 can be placed on a support structure 224, placed on the seabed, carried by an ROV or AUV 216 that is stationary on the seabed, carried by an ROV or AUV 216 that is floating in a station-keeping mode, or otherwise carried or placed in the vicinity of the acoustic transponder 228.

The next step is to locate metrology system 202 in relation to the field 100 (step 1016). Information regarding the location of the metrology system 202 can be provided by the INU 403. Alternatively, or in addition, the metrology system 202 can obtain information regarding its location by referencing one or more geo-located monuments 226, target stands 222, 3-D targets 240, or 2-D targets 244 or other stationary structures or indicia on the seabed, or even by the seabed features themselves. Location information obtained relative to the geo-location monuments 226 or other structures or indicia can replace or be supplemented by the known location of the metrology system 202, obtained, for example, from an INU 403, or other stationary structures on the seabed such as manifolds 128, wells 130, or suction piles 136, or even by the seabed features themselves. Note the location can be geo-referenced or can be relative to the locations of the monuments 226, or other structures or objects 102 on the seabed.

As shown, the geo-located monument 226 can include indicia 512, such as a two-dimensional 244 and three dimensional 240 targets, acoustic transponders 228, and scales to assist in determining the relative location of the metrology system 202, a nearby acoustic transponder 228, or other objects 102. In accordance with further embodiments of the present disclosure, the indicia 512 can include information uniquely identifying an associated geo-located monument 226.

Figure 11:
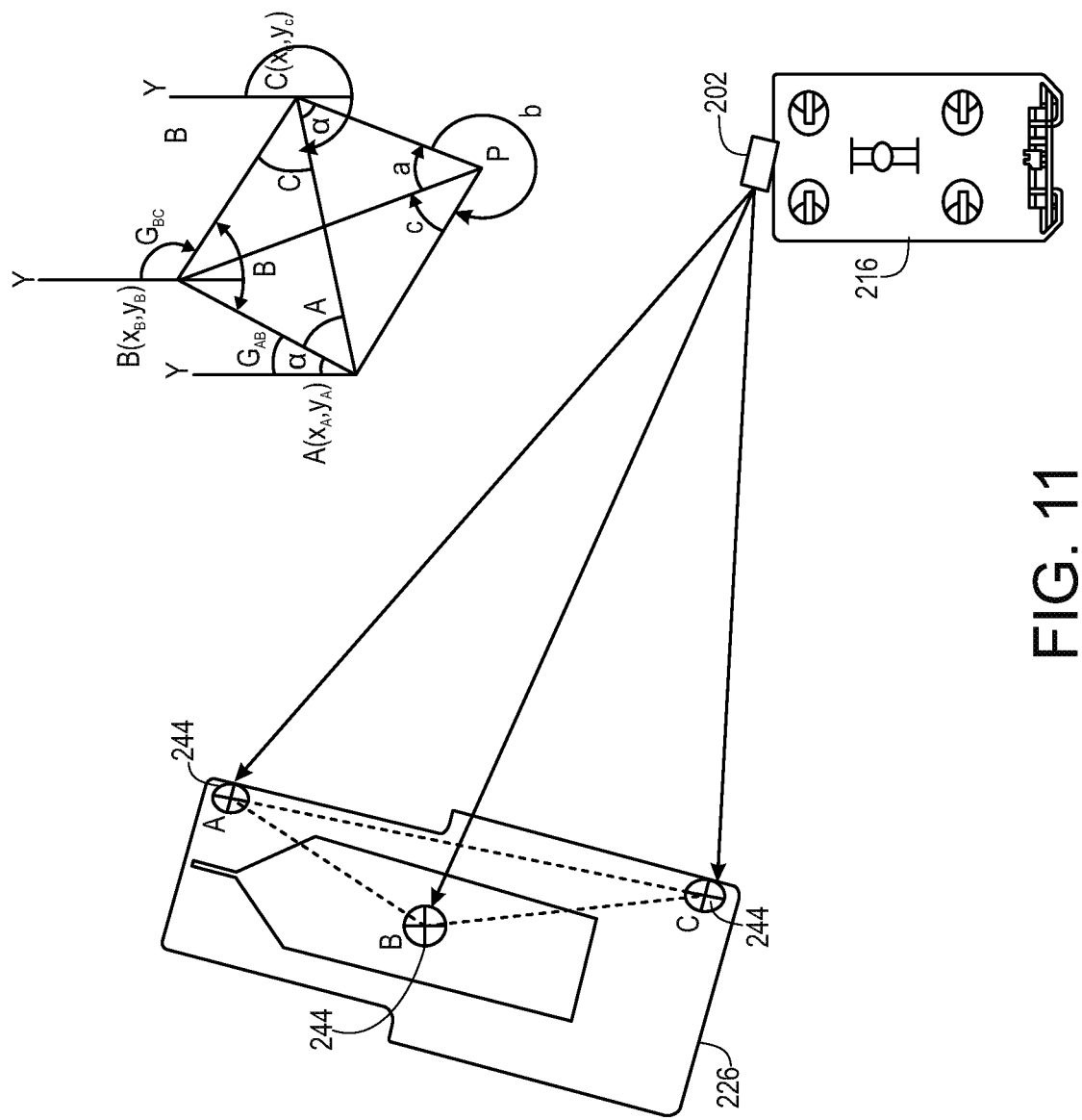
FIG. 11 depicts an undersea scenario in which a monument is used to find the location of a metrology system.
Figure 12:
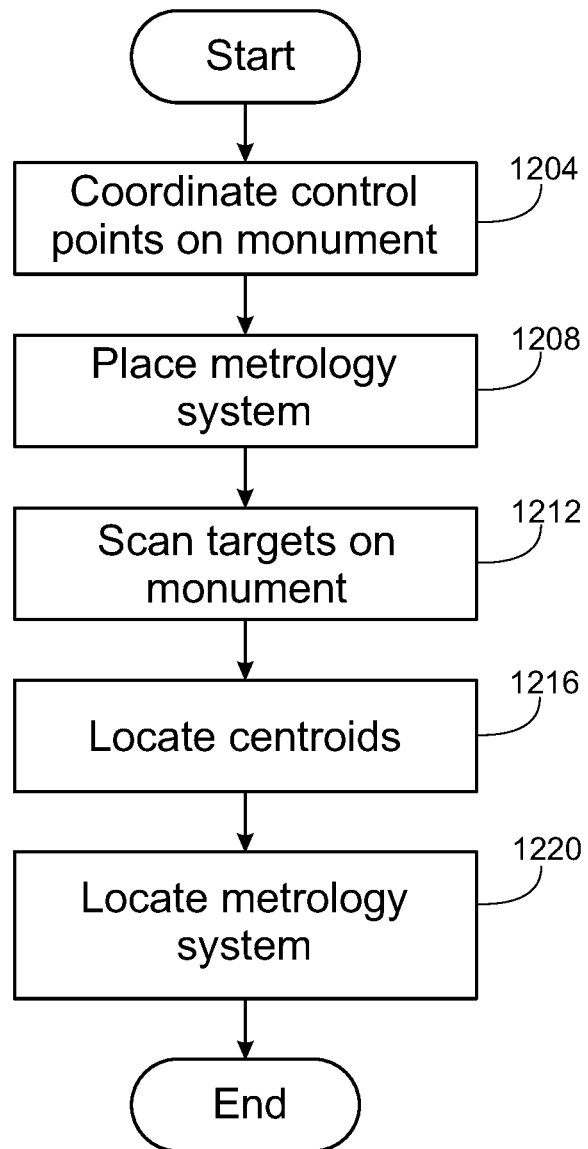
FIG. 12 is a flowchart depicting aspects of a method of operating a combined system in accordance with the scenario of FIG. 11.

The metrology system 202 is then used to create a 3D point cloud that includes the acoustic transponder 228 (step 1020). With a known location of metrology system 202, this point cloud can be put in global or georeferenced coordinates so the location of indicia 512 on the acoustic transponder 228, and thus the location of the transponder 228, is known in georeferenced X, Y, Z space (step 1024). In an additional embodiment, the point cloud includes both the acoustic transponder 228 and the monument 226. The relative location of the acoustic transponder 228 is then determined in 3D space (X, Y, Z coordinates) with respect to monument 226. The DC offsets for the exact acoustic transponder 228 can then be applied to identify the location of the acoustic transducer 516 in 3D space (step 1028). The process can then end. FIG. 11 depicts an undersea scenario in which a monument 226 or other structure 102 is used to find the location of the metrology system 202. FIG. 12 is a flowchart depicting aspects of the process that can be performed in connection with the scenario of FIG. 11. Initially, at least three control points or targets 244 on the monument 226 are coordinated or georeferenced (step 1204). The at least three previously coordinated reference points or targets 244, are shown as points A, B, and C in FIG. 11. The metrology system 202, in this example carried by an underwater vehicle 216 in the form of an ROV, is placed at a location from which the targets 244 on the monument 226 are visible, to enable the metrology system to determine its location relative to the targets 244 (step 1208). More particularly, the lidar device 308 included in the metrology system 202 is operated to scan the targets 244 (step 1212). The centroids of the targets 244 are then located, for example by operation of an image analysis module included in the application software 463 (step 1216). The location of the metrology system relative to the targets 244 can then be determined, for example by performing a three point resection traverse, in which the location of the metrology system 202 is calculated from the determined angles subtended by lines of sight from the metrology system 202 to the previously coordinated targets 244 (step 1220). Moreover, where the monument 226 is itself geolocated, determining the location of the metrology system 202 relative to the monument 226 allows the metrology system 202 to itself be geolocated. Having identified its location relative to a monument 226 having a known location, the metrology system 202 can precisely determine the location of other objects 102, including but not limited to other monuments 226, target stands 222, and acoustic transponders 228.

Figure 13:
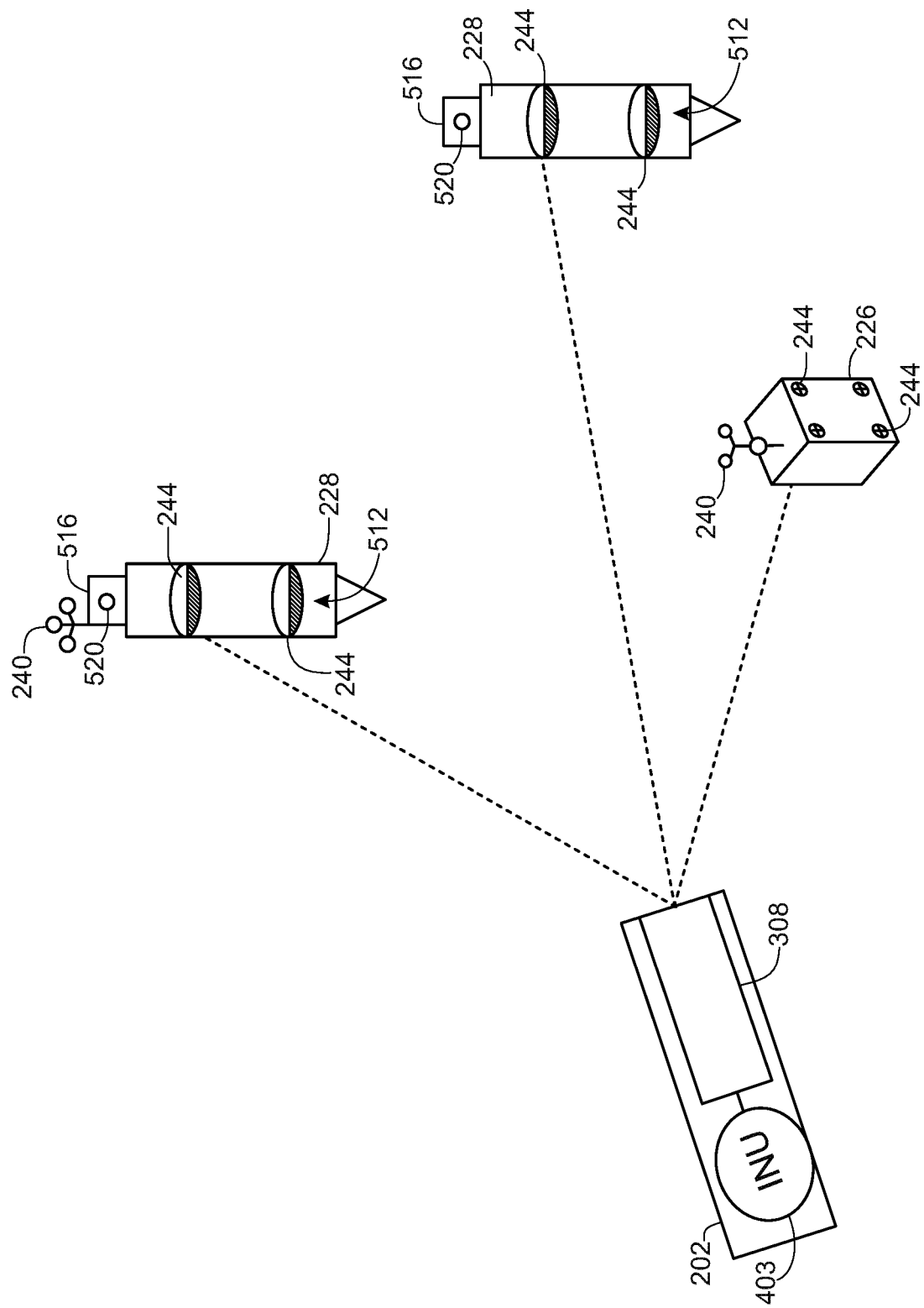
FIG. 13 depicts an undersea scenario including the use of multiple acoustic transponders and a geolocated monument in accordance with embodiments of the present disclosure.
Figure 14:
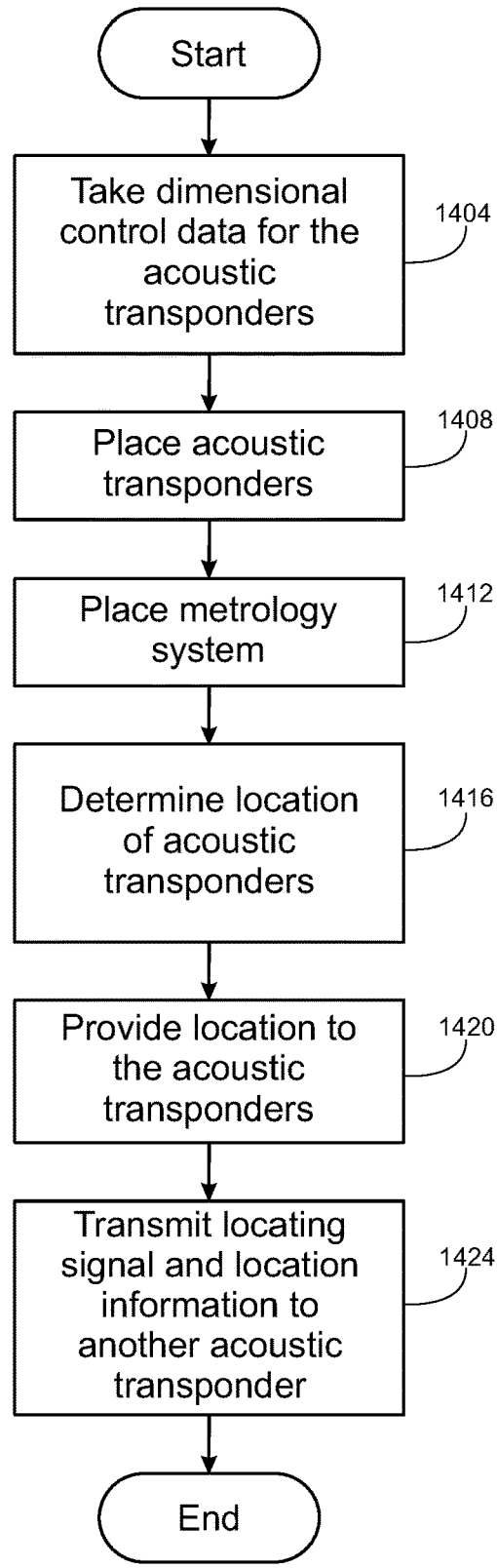
FIG. 14 is a flowchart depicting aspects of a method of operating a combined system in accordance with the scenario of FIG. 13.

FIG. 13 depicts an undersea scenario including the use of multiple acoustic transponders 228 and one or more geo-located monument 226 or other stationary structures on the seabed, or even the seabed features themselves in accordance with embodiments of the present disclosure. In this scenario, the multiple acoustic transponders 228 can each include indicia 512 in the form of reference targets 240 or 244. Information regarding the X, Y, Z location of the acoustic transponders 228 can be provided from the metrology system 202 to the transponders 228 themselves, which can result in the transponders 228 having improved location accuracy as compared to transponders 228 that rely solely on acoustic information exchanged with other transponders 228. More particularly, and with reference now to FIG. 14, the dimensional control data, including the relationship between targets 240 and/or 244 and the center point 520 of the acoustic transducer 516 for each of the acoustic transducers 228 can be taken (step 1404). The dimensional control data can be taken on the surface, before the acoustic transponders are placed on the seabed, and can be stored, for example in data storage 824 of a monitoring and control station 804 of the combined system 200. The acoustic transponders 228 can then be placed on the seabed (step 1408). The metrology system 202 can then be placed such that the acoustic transponders 228 and a previously placed monument 226 with coordinated targets 240 and/or 244 are in view of the metrology system (step 1412). The metrology system 202 can then be operated to determine the location of one or more of the acoustic transponders 228 relative to the monument 226 using the included lidar device 308 (step 1416). The precisely determined location of an acoustic transponder 228 can then be provided to that acoustic transponder 228, where the location information can be stored (step 1420). The location information can be relative to the monument 226 or can be a georeferenced location. In accordance with at least some embodiments of the present disclosure, the location for a particular acoustic transponder 228 determined by the metrology system 202 is communicated to that acoustic transponder 228 using an acoustic carrier signal generated by an acoustic transceiver 310 included in the metrology system 202.

Acoustic transponders 228 can then relay their location information to each other, together with a conventional acoustic locating signal (step 1424). This can enable a combined system 200 in accordance with embodiments of the present disclosure to provide location information with enhanced precision as compared to systems that do not include the optically determined location of a transmitting acoustic transponder with conventional ranging information or range and direction information. In particular, if an acoustic transponder 228 is given its X,Y,Z, roll, pitch, yaw location from a metrology system 202, and then receives the location of another transponder 228, it knows the exact range and location of the other acoustic transponder 228. The range can be compared to its acoustic range for that acoustic transponder 228. This can be used as a critical quality control check for the range between acoustic transponders 228. Moreover, in this scenario the two ranges are calculated using different sensor physics (acoustic and optical), providing for a very robust system. For example, the X, Y, Z location information of the acoustic transponders 228 can be provided with millimeter accuracy, as compared to the centimeter to meter accuracy that is available using acoustic range information alone. Moreover, by combining light based and sound based locating methodologies, the ability to obtain a relative range information between nodes of the system or field under different environmental or failure conditions can be improved as compared to scenarios utilizing a single methodology for obtaining such information. In accordance with further embodiments of the present disclosure, the indicia 512 can include information uniquely identifying an associated acoustic transponder 228. This can include a bar code type system that the optical system, such as the lidar device 308, automatically reads. The system 200 can then use a database or other method to identify the unique transponder 228 and acquire the DC offsets or other metadata from a database. This reduces the need for ROV video identification.

In additional embodiments, the location data of acoustic transponders 228 as determined by a metrology system 202, and the acoustic range data collected by acoustic transponders 228, can both be sent to a local processing center or a topside processing center 804 to process and compare the location data using the two methods.

Figure 15:
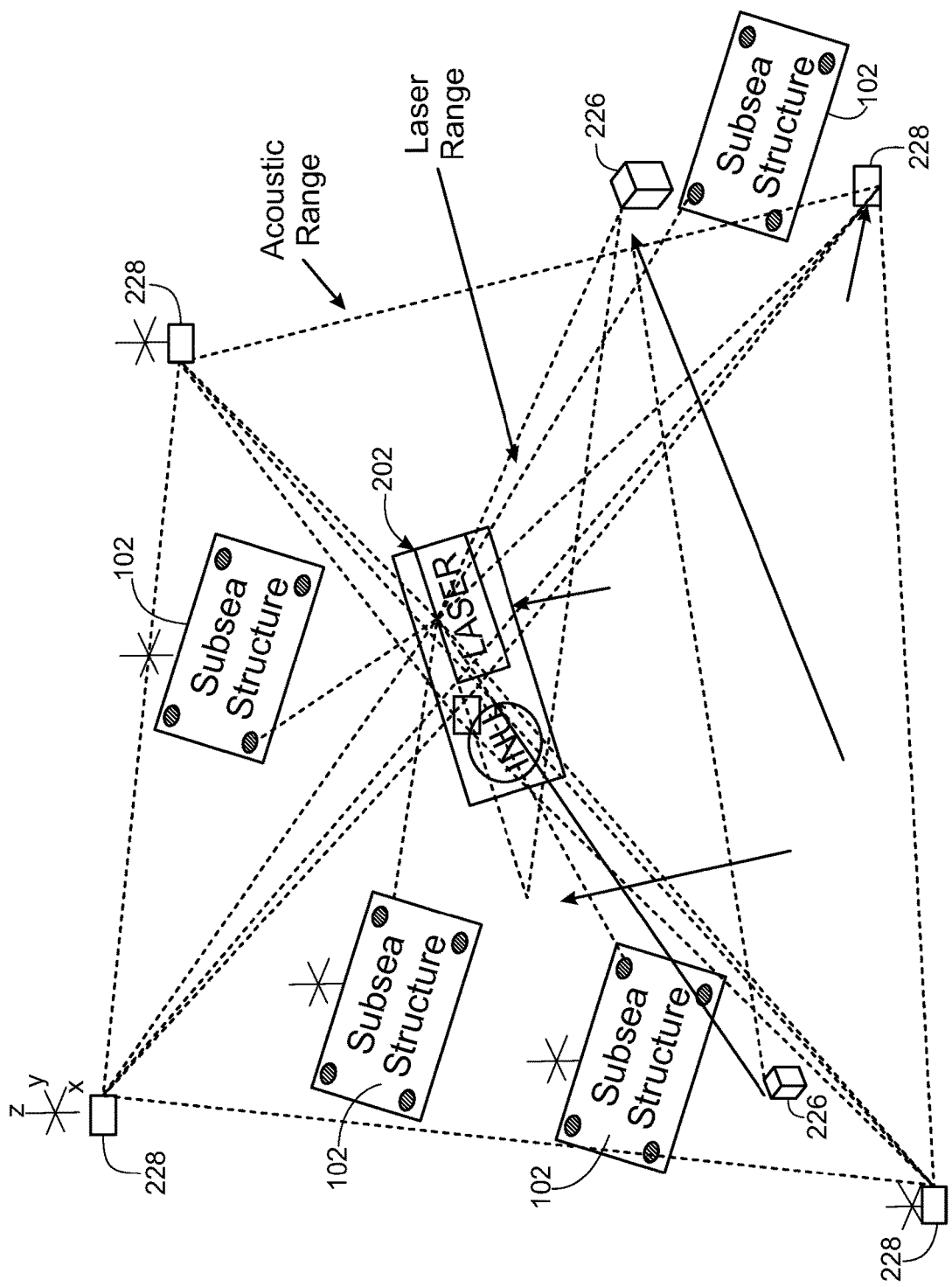
FIG. 15 depicts an undersea scenario including multiple objects and the use of multiple acoustic transponders and multiple geo-located monuments in accordance with embodiments of the present disclosure.
Figure 16:
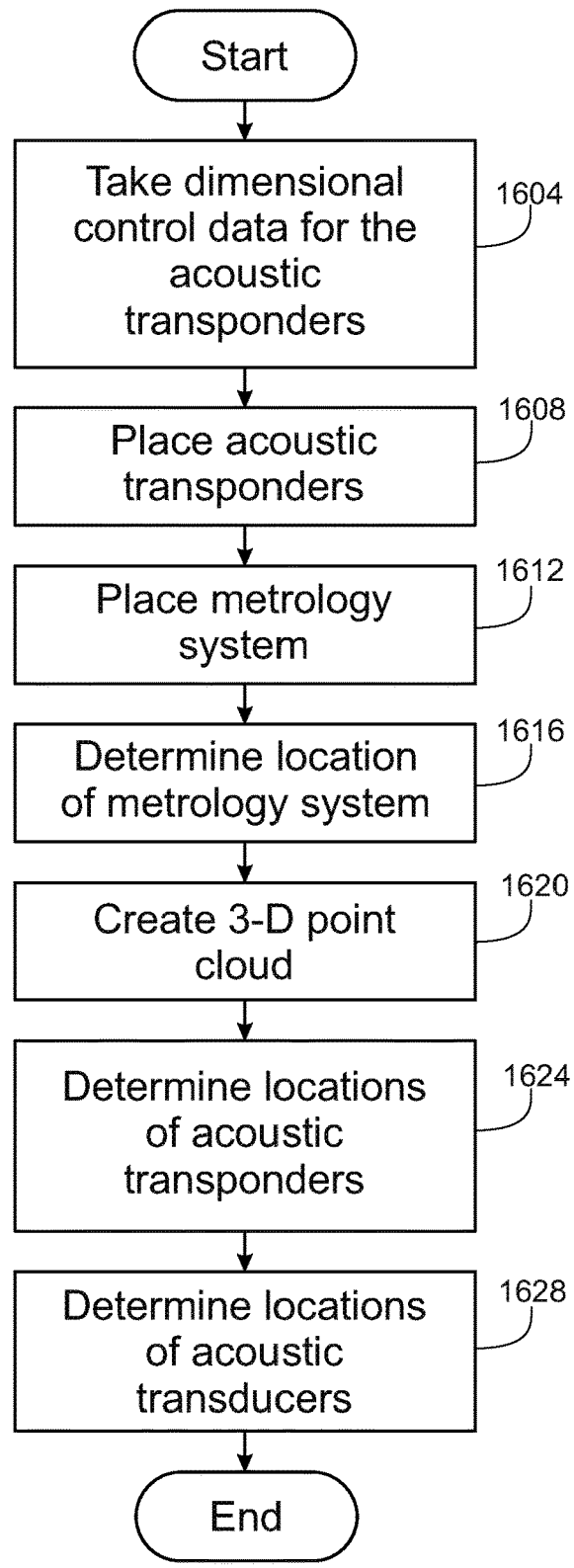
FIG. 16 is a flowchart depicting aspects of a method of operating a combined system in accordance with the scenario of FIG. 15.

FIG. 15 depicts an undersea scenario encompassing a field that includes multiple undersea structures or other objects 102, multiple acoustic transponders 228 and multiple geo-located monuments 226 in accordance with embodiments of the present disclosure. As depicted in FIG. 16, in this scenario indicia 512 is applied to the acoustic transponders 228, and DC data is collected from the relationship of the indicia 512 to the acoustic element or transducer 516 of each transponder 228 (step 1604). Each acoustic transponder 228 is also uniquely marked so the unique data for each acoustic transponder 228 is captured. This can include a bar code type system that the optical system or lidar device 308 automatically reads. The system 200 can then use a database to identify the unique transponder and acquire the DC offsets or other metadata from a database. This reduces the need for ROV video identification. The acoustic transponders 228 are then lowered and placed in the field 100 at approximately known locations (step 1608). A metrology system 202 is also lowered and placed in the field 100 at an approximately known location (step 1612). The metrology system 202 can be placed on a support structure 224 placed on the seabed, carried by an ROV or AUV 216 that is stationary on the seabed, carried by an ROV or AUV 216 that is floating in a station-keeping mode, carried by an ROV or AUV 216 that is floating but latched on (through manipulators or other device) to a structure on the seabed for stability, or otherwise carried or placed in the vicinity of the acoustic transponders 228.

The next step is to locate metrology system 202 in relation to the field 100 (step 1616). Information regarding the location of the monitoring system 202 can be provided by the INU 403. Alternatively, or in addition, the monitoring system 202 can obtain information regarding its location by referencing one or more geo-located monuments 226 or other stationary structures on the seabed, or even by the seabed features themselves. Location information obtained relative to the geo-location monuments 226 can replace or be supplemented by the known location of the metrology system 202, obtained, for example, from an INU 403, or other stationary structures on the seabed such as target stands 222, manifolds 128, wells 130, or suction piles 136, or even by the seabed features themselves. Note the location can be geo-referenced or can be a location that is relative to locations of the structures on the seabed.

A 3-D point cloud that includes acoustic transponders 228 is then created using the lidar device 308 included in the metrology system 202 (step 1620). With a known location of metrology system 202, this point cloud can be put in global or georeferenced coordinates so the location of indicia 512 is known in georeferenced X, Y, Z space. Alternately, the location can be relative to a specific structure or feature, or relative to the monitoring system itself. In an additional embodiment, the point cloud includes both the transponders 228 and monuments 226. The relative locations of the acoustic transponders 228 are then determined in 3D space (X,Y,Z, roll, pitch, yaw coordinates) with respect to one or more of the monuments 226 (step 1624). The DC offsets for each of the acoustic transponders 228 can then be applied to identify the location of the acoustic element 516 of each acoustic transponder 228 in 3D space (step 1628). The process can then end.

Figure 17:
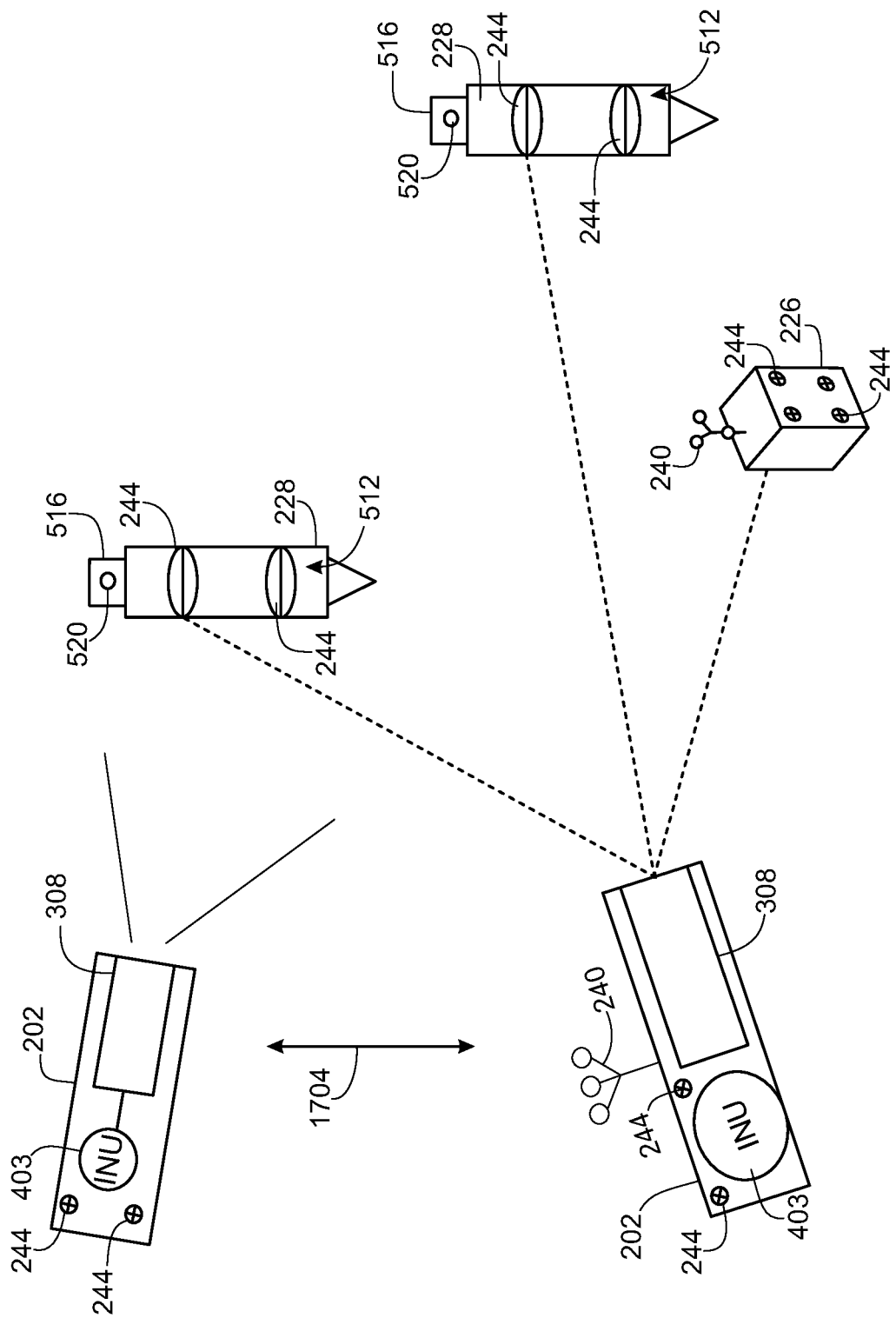
FIG. 17 depicts an undersea scenario including multiple acoustic transponders and multiple metrology systems in accordance with embodiments of the present disclosure.

FIG. 17 depicts an undersea scenario including multiple monitoring systems 202 exchanging location information with one another via a communication link 1704 established in accordance with embodiments of the present disclosure. The use of multiple monitoring systems 202 can be advantageous, for example where the desired field of coverage is relatively large. In such a scenario, the monitoring systems 202 can advantageously exchange location information with one another. In accordance with embodiments of the present disclosure, the different monitoring systems 202 can identify and locate one another using indicia 512, such as targets 240 and/or 244, placed on exterior surfaces of the monitoring systems 202.

Figure 18:
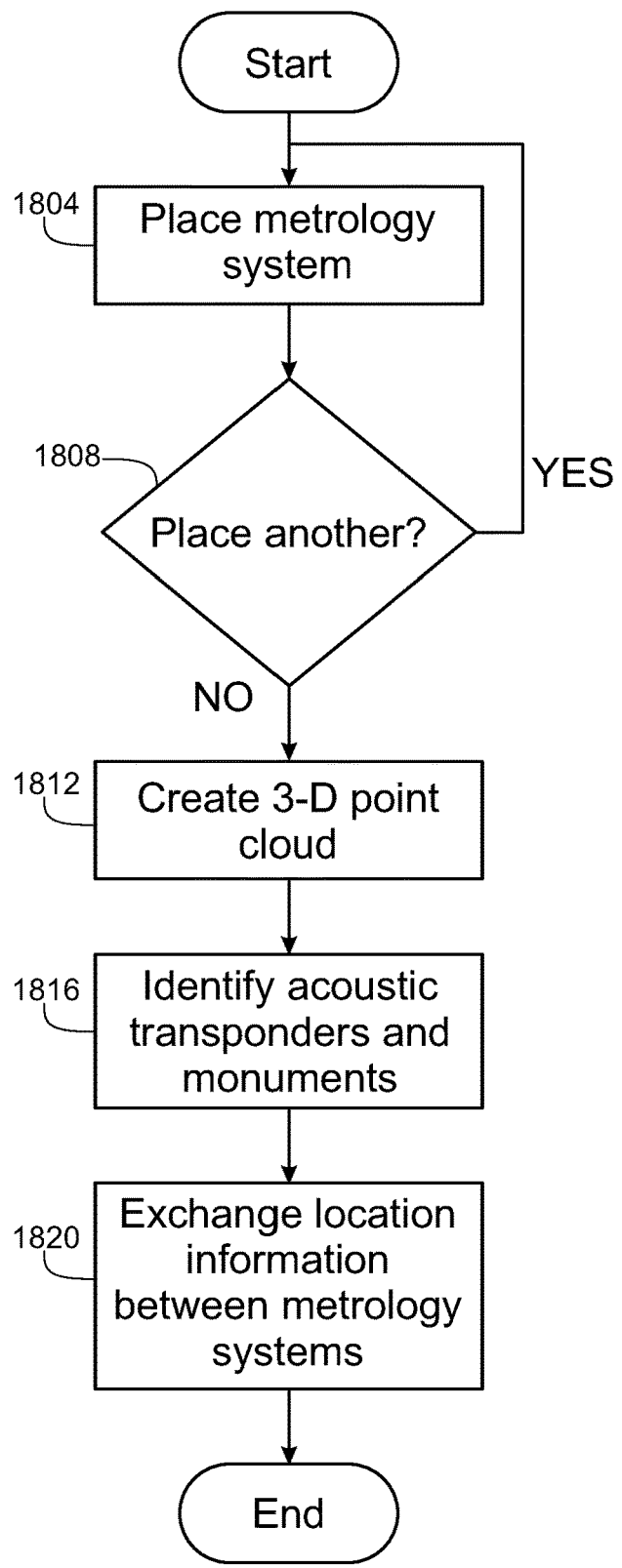
FIG. 18 is a flowchart depicting aspects of a method of operating a combined system in accordance with the scenario of FIG. 17.

With reference now to FIG. 18, aspects of the operation of a combined system 200 in accordance with embodiments of the present disclosure, where multiple metrology systems 202 are included, as depicted in FIG. 17, are illustrated. In this example, at step 1804, a metrology system is placed in an underwater field in which a monument 226 and acoustic transducers 228 have already placed. At step 1808, a determination is made as whether any additional metrology systems 202 are to be placed in the field. In this example, at least two metrology systems 202 will be placed in the scene. After all of the desired metrology systems 202 are in place, the metrology systems are operated to generate point cloud data (step 1812). Individual acoustic transponders 228 and/or monuments 226 within the different sets of point cloud data generated by the different metrology systems 202 can then be identified, and their locations can be determined (step 1816). Note the unique identifying marks on transponders 228, monuments 226, or other objects 102 can include a bar code type system that the optical system automatically reads. The system can then use a database to identify the unique transponder, monument, or structure and acquire the DC offsets or other metadata from a database, such as exact hub number, installation date, etc. This not only provides additional information, but also reduces the need for ROV video identification.

The location information regarding the identified acoustic transponders 228 and monuments 226 can then be exchanged between the metrology systems 202 (step 1820). The information can be exchanged through a direct acoustic link between the different metrology systems, for example established by the included acoustic transceivers 310. As another example, the information can be exchanged through a relay, such as through a monitoring and control station. As a further example the information can be exchanged by optical communications. In addition, the point cloud data and/or location information determined by the metrology system 202 can be communicated to a monitoring and control station 804 or other combined system 200 node. The monitoring and control station 804 or other node can then stitch together the data to provide a wide area set of 3-D location information. The process can then end.

Subsea structures 102 can have acoustic transponders 228 located on them, along with DC information that locates the acoustic transponder 228 onto the structure. The subsea structure is then located within the acoustic array comprising the set of multiple, for example as depicted in FIG. 15, four, acoustic transponders 228, by the acoustic transponders 228 pinging range and possibly azimuth and elevation angular information to each other. Many more acoustic transponders 228 are normally used to increase the accuracy of the array and to provide redundancy when power goes low (batteries die) on the acoustic transponders. The solution for the location of the subsea structure acoustic transponder can be calculated on the surface.

By including a metrology system 202 having an active optical system, the lidar device 308, in the field 100, several advantages are obtained. First, a lesser number of acoustic transponders 228 can be used as compared to a classic arrangement in which only acoustic location information is utilized, because the lidar device 308 of the metrology system 202 can be used to locate (geo or relative) the acoustic transponders 228 with respect to on another more accurately than can be done using acoustic transponder 228 alone. Also, the metrology system 202 can be used to locate the subsea structures 102 using optical targets 240 on the structures 102. The locations of the acoustic transponders 228 and the locations of the structures 102 obtained by the acoustic system and obtained by the optical system can then be sent to a central processing center either underwater or topside. The acoustic and optical results can be compared for accuracy and redundancy.

For instance, if an acoustic transponder 228 ran out of batteries or went bad, the metrology system 202 can still give that transponder's 228 location to the array or remaining, active acoustic transponders 228. In reverse, if water visibility turned poor due to a storm or currents or subsea operations that stirred the seabed, and the range of the optical monitoring system 308 was decreased, the acoustic system can then be used or weighed higher in the combined data.

The inclusion of a metrology system 202 within a field of multiple acoustic transponders 228 can provide for more accurate angular and distance measurements between the included objects, including the acoustic transponders 228, as compared to scenarios in which acoustic transponders 228 are used without a light based measuring system. Alternatively or in addition, fewer acoustic transponders 228 may be used across the field, as compared to scenarios in which a light based measurement system 308 is not included. The range and angle measurements can further be improved by including one or more geo-located monuments 226.

Figure 19:
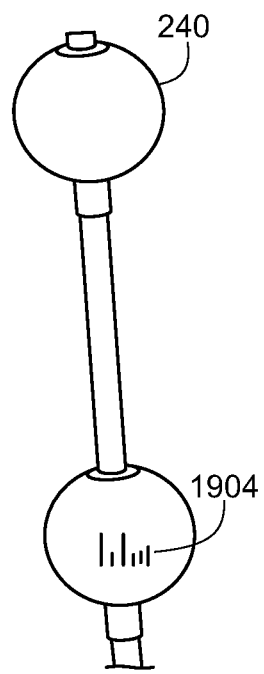
FIG. 19 depicts a 3-D target in accordance with embodiments of the present disclosure.
Figure 20:
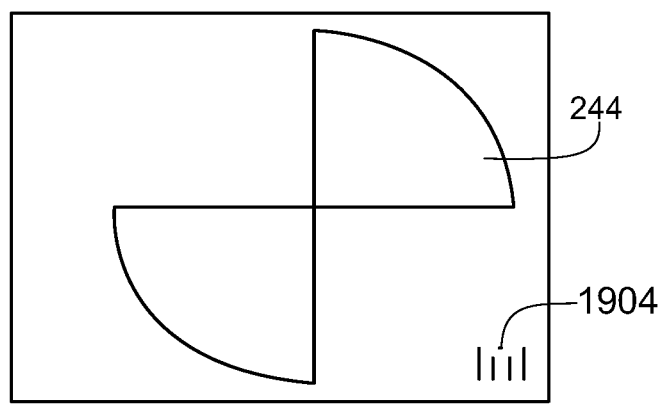
FIG. 20 depicts a 2-D target in accordance with embodiments of the present disclosure.

FIG. 19 depicts a 3-D target 240 in accordance with embodiments of the present disclosure, and FIG. 20 depicts a 2-D target 244 in accordance with embodiments of the present disclosure. The targets 240 and 244 can include shapes that assist a metrology system 202 in determining a relative orientation of the target 240 and 244, and the associated object 102, monument 226, target stand 222, or acoustic transponder 228. The target 240 or 244 can additionally include identifying markings 1904 that allow the target 240 or 244 and/or the associated object 102, monument 226, target stand 222, or acoustic transponder 228 to be uniquely identified. Moreover, the identifying markings 1904 can allow a surface, component, or other feature of an object 102 to which the target 240 or 244 is mounted or applied to be identified. Note the unique identifying marks on transponders 228, monuments 226, target stand 222 or other objects 102 can include a bar code type system that the optical system automatically reads. The system can then use a database to identify the unique transponder, monument, target stand or structure and acquire the DC offsets or other metadata from a database, such as exact hub number, installation date, etc. This not only provides additional information, but also reduces the need for ROV video identification. In accordance with further embodiments of the present disclosure, the target 244 may comprise a three-dimensional target that provides the shapes 1904 in the form of the physical shape of the target 244. A target 244 in the form of a three-dimensional object may additionally include two-dimensional shapes or identifying markings 1904. A target 240 can also be provided in the form of an entirely two-dimensional shape and/or identifying markings 1904. In accordance with still other embodiments of the present disclosure, a target 240 or 244 can modify a polarization, amplitude, phase, and wavelength, or other attribute of incident light that is received from and reflected back to a metrology system 202. In another example, a target 240 or 244 may comprise one or more prisms. In accordance with further embodiments of the present disclosure, the target 240 or 244 can include a hologram that modifies light received from a metrology system 202 to produce a particular pattern.

In an additional embodiment, an acoustic transponder 228 can be uniquely identified by a laser metrology system 202 by using the optical metrology system 308 of the metrology system 202 to measure the vibration signature of the acoustic transducer 516. In particular, if each acoustic transponder 228 has a unique acoustic code it transmits, a laser monitoring system can detect this unique code by operating the lidar device 308 to dwell along a line of sight to the acoustic transponder 228, and in particular the acoustic transducer 516 of the acoustic transponder 228, to optically measure the vibration and thus signal of the transducer 516.

In accordance with embodiments of the present disclosure, a combined system 200 utilizes both acoustic and optical information to locate objects 102 in an underwater environment. A metrology system 202 provided as part of the combined system 200 can thus include a lidar device 308 to obtain precise, optically derived location and range information for targets 240 or 244. From relative location information obtained by optically detecting targets 240 or 244 associated with a georeferenced monument 226 or other georeferenced structure or object 102, the metrology system 202 can determine the geolocation of other objects 102, including by not limited to acoustic transponders 228. The combined system 200 can also use acoustic methodologies for determining location. For instance, an initial, relatively coarse location may be determined using the acoustic transceiver 310 of a metrology system 202. That initial location can be used to assist the metrology system 202 in pointing the lidar device 308 toward optical targets 240 or 244 associated with a georeferenced monument 226 or structure 102. In addition, precise, optically derived location information for an acoustic transponder 228, and in particular the acoustic transducer 516 of the acoustic transponder 228 can be determined using the lidar device 308 of the metrology system 202. Location information derived from an acoustic output of the acoustic transponder can then be more accurate, since the location of the emitting acoustic transponder 228 is itself more accurately determined than if acoustic signals alone were used to locate that acoustic transponder 228. In accordance with still other embodiments of the present disclosure, acoustic and optical signal methodologies are combined simultaneously. For instance, a lidar device 308 can dwell for a period of time along a line of sight that intersects the surface of an acoustic transducer 516 included as part of an acoustic transponder 228. A frequency or modulated frequency output by the acoustic transducer 516 as an identification signal can then be detected using the lidar device 308. Moreover, by pointing the lidar device 308 at a particular acoustic transponder 228 emitting an identification signal, the identity and location of that acoustic transponder 228 can be determined with certainty. This can be useful in various scenarios, for example where noise in the underwater environment makes identifying a particular acoustic transducer 228 using the acoustic signal alone difficult.

Embodiment of the present disclosure further support the reliable locating of objects 102 in an underwater environment in various conditions and over large areas. Moreover, the combined system 200 described herein provides for the integration of acoustic and optical locating methodologies. For instance, a first metrology system 202 within sight of a georeferenced monument 226 can determine a geolocation of an acoustic transponder 228 also within sight of the metrology system 202 with great accuracy. This provides location information derived at least in part from an acoustic signal output from the optically geolocated acoustical transponder 228 to be more accurate than if it were only acoustically geolocated. In addition, the use of optical locating methodologies enables the use of accurate, three point resection traverses, which in turn allows the location of underwater structures 102 to be determined accurately.

In addition, by also including acoustic technologies, some level of location information can be provided even when the water within the environment is turbid. For instance, where turbidity and/or the distances between underwater objects 102 preclude the use of optical metrology techniques over the entire underwater area or scene, a metrology device 202 at one or both ends can utilize optical techniques for precisely locating other underwater objects 102 within the range of the lidar device 308, while acoustic devices can provide location information for other segments of a chain of located objects 102.

As a specific example, consider a classic underwater spool piece metrology where a pipe section is needed to connect a well head to a manifold. The hubs on each end are the connection points for the connecting pipe. Key pieces of information required for building this custom pipe are the slope distance between hubs as well as relative inclinations from one hub to another in both pitch and roll. Other requirements are, relative heading, and height above seabed for each hub. Sometimes the seabed profile is also required.

In several instances the optical system alone can perform this measurement. However, if the pipe distance is extremely long, for instance 100 meters, or water clarity is poor, then the optical system alone is not optimal. In this scenario, acoustic transponders are placed near the hubs at each end. The metrology device 202 is then used at each hub to measure pitch, roll, heading, height above seabed, surrounding seabed profile, and acoustic transponder 228 locations near each hub. The distance between hubs is then calculated using the acoustic transponder 228 information from each end. The point clouds from each end are basically tied together into a common reference frame by the acoustic transponder data.

In a further embodiment, the above processes can be performed with an optical system alone using two different reflectivity levels for targets 240 or 244, on the objects 102, or in conjunction with the acoustic system as a back-up or validation. In this scenario, highly optically reflective targets and standard targets 240 or 244 are placed on the objects 102 at the surface and dimensional control data is acquired between all the targets. The objects and metrology system are then placed subsea. The subsea metrology device 202 is placed near one of the structures and a full scan of the object is taken at a normal gain setting, which will produce saturated data for the highly reflective target. This point cloud dataset will include the standard reflectivity targets along with the structure itself and potentially surrounding seafloor, so it is a complete point cloud dataset with information on targets and structures. Before moving the metrology system, a very low gain scan is also performed which allows for the highly reflective targets to not be saturated. This dataset will capture limited or no returns from the standard reflectivity targets, the structure, or seafloor. Therefore it is not a complete point cloud but rather a dataset with only the highly reflective target returns, Since the two scans were acquired from the same metrology system location, they can be merged into a common point cloud. In another embodiment, the highly reflective targets are placed after the object is underwater or is placed on target stands 222 near the object 102.

The metrology system 202 then pans over in the direction of the other hub and performs a high-level scan. The only object that will be visible to the metrology device are the highly reflective targets. Therefore the resulting point cloud contain no information on the standard targets or objects or seabed. However, since DC data was taken topside the entire structure can be located using the highly reflective targets. The same operation can be performed at the other hub for redundancy and to obtain pitch, roll, heading, height above seabed, and seabed profile information for the second hub from the standard scan. As an additional embodiment, the metrology system 202 is placed approximately mid-distance between the two hubs and only the highly reflective targets 240 or 244 are captured from each hub, but both are captured from the same scan location. This can be performed as another redundancy step and data check.

A highly reflective target is any target 240 or 244 that gives an almost mirror like return, such as a survey prism, other prism, retro-reflectors, mirror, reflective tape, reflective paint, micro-spheres, and other micro objects or shapes that can be embedded in paints, tapes, and materials in order to produce retro-reflections or very high signal returns.

In accordance with at least some embodiments of the present disclosure, the technology encompasses:

(1) A method for locating objects underwater, comprising:
placing a first metrology device at a first approximate location;
operating an optical metrology system provided as part of the first metrology device to determine a location of the first metrology device relative to an object having a known location;
placing a first acoustic transponder at a second approximate location;
operating the optical metrology system of the first metrology device to determine a location of the first acoustic transponder relative to the known location.

(2) The method of (1), further comprising:
prior to placing the first acoustic transponder at the second approximate location, applying a target to the first acoustic transponder, and determining dimensional control data concerning a relationship between the applied target and an acoustic transducer of the first acoustic transponder.

(3) The method of claim (1) or (2), further comprising:
operating the first acoustic transducer to output at least one of an identification and a ranging signal.

(4) The method of any of (1) to (3), further comprising:
operating the optical metrology system of the first metrology system to point at the acoustic transducer of the first acoustic transponder over time and to measure a vibration of the acoustic transducer and thus acquire the acoustic signal output from the acoustic transponder while the optical metrology system is pointed at the acoustic transducer.

(5) The method of any of (1) to (4) wherein an optically reflective target is placed on a center point of the acoustic transducer.

(6) The method of any of (1) to (5), wherein the object has targets and indicia, and wherein the indicia allows for unique identification to access metadata on the object such as offsets, hub number, and date of installation.

(7) The method of any of (1) to (6), wherein the object is geolocated, and therefore the first metrology system and the first acoustic transponder can be geolocated.

(8) The method of any of (1) to (7), wherein an acoustic array and inertial navigation unit (INU) system are used to geolocate the first metrology system and the first acoustic array.

(9) The method of any of (1) to (8), further comprising:
determining a range between the acoustic transducer placed at the second approximate location and another acoustic transducer.

(10) The method of any of (1) to (9), further comprising:
communicating the determined location of the first acoustic transponder from the first metrology system to the first acoustic transponder; and
storing the determined location of the first acoustic transponder on the first acoustic transponder.

(11) The method of (10), further comprising:
placing a second acoustic transponder;
communicating the determined location of the first acoustic transponder to the second acoustic transponder.

In accordance with still further aspects of the present disclosure, the technology encompasses:

(12) A system for locating objects underwater, comprising:
a plurality of acoustic transponders, the acoustic transponders each including:
    an acoustic transducer;
    indicia, wherein dimensional control information concerning a relationship between the acoustic transducer and the indicia is known;
a metrology system, the metrology system including:
    a light source;
    a receiver; and
    a processor, wherein the processor operates the light source to generate light that is directed towards a first acoustic transponder included in the plurality of acoustic transducers, reflected from the first acoustic transponder, and received at the receiver to determine a location of the first acoustic transponder relative to the metrology system.

(13) The system of (12), wherein an acoustic transducer of the first acoustic transponder, in a first operating mode, generates an identification signal.

(14) The system of (12) or (13), wherein the metrology system is operable to detect the identification signal of the first acoustic transponder using the light source and the receiver.

(15) The system of any of (12) to (14), wherein the metrology system further includes an acoustic transceiver.

(16) The system of any of (12) to (15), wherein the indicia includes targets placed on the acoustic transponders.

(17) The system of any of (12) to (16), wherein the indicia allows for unique identification to access metadata on the object such as offsets, hub number, and date of installation.

(18) The system of any of (12) to (17), wherein the indicia are similar to a bar code system that is read by the optical system.

(19) The system of any of (12) to (18), wherein the locations of the plurality of transponders and the plurality of metrology systems are all shared and stored at a central processing center.

In accordance with still further aspects of the present disclosure, the technology encompasses:

(20) A method for locating objects underwater, comprising:
determining a location of a plurality of acoustic transponders;
for at least a first acoustic transponder included in the plurality of acoustic transponders, storing the determined location in memory included in the first acoustic transponder;
communicating a location of the first acoustic transponder from the first acoustic transponder to a second acoustic transponder included in the plurality of acoustic transponders.

(21) The method of (20), wherein determining a location of a plurality of acoustic transponders includes determining a location using an optical metrology system.

(22) The method of (20) or (21), wherein the first acoustic transponder includes a first target and a first acoustic transducer, the method further comprising:
determining dimension control information regarding a location of the first target relative to a center of the first acoustic transducer.

In accordance with still further aspects of the present disclosure, the technology encompasses:

(23) A method for performing a long-distance metrology, comprising,
placing both low and high reflectivity targets on a structure;
taking dimension control (DC) data of the targets and the structure;
placing a first metrology system at a first location close to at least a first portion of the structure and performing first and second scans of the structure, wherein the first scan is at a standard gain level to capture a first point cloud that includes returns from the structure, low reflectivity targets, and seabed, wherein the second scan is at a low gain level to capture a second point cloud that includes returns from the high reflectivity targets.

(24) The method of (23), further comprising:
placing one of the first metrology system and a second metrology system at a second location close to at least a second portion of the structure and performing third and fourth scans of the structure, wherein the third scan is at a standard gain level to capture a third point cloud that includes returns from the structure, low reflectivity targets, and seabed, wherein the fourth scan is at a low gain level to capture a fourth point cloud that includes returns from the high reflectivity targets.

(25) The method of (24), further comprising:
locating at least some of the high reflectivity targets in the returns in both the second and fourth point clouds;
combining the first and third point clouds using the at least some of the high reflectivity targets in the returns in both the second and fourth point clouds as control points.

(26) The method of any of (23) to (25), wherein the long range data collected from the high reflectivity targets are cross-checked with acoustic transponder data across the same distance.

The foregoing discussion has been presented for purposes of illustration and description. Further, the description is not intended to limit the disclosed systems and methods to the forms disclosed herein. Consequently, variations and modifications commensurate with the above teachings, within the skill or knowledge of the relevant art, are within the scope of the present disclosure. The embodiments described hereinabove are further intended to explain the best mode presently known of practicing the disclosed systems and methods, and to enable others skilled in the art to utilize the disclosed systems and methods in such or in other embodiments and with various modifications required by the particular application or use. It is intended that the appended claims be construed to include alternative embodiments to the extent permitted by the prior art.

What is claimed is:

1. A metrology system, comprising:
a pressure vessel;
a monitoring system, wherein at least some portions of the monitoring system are contained within the pressure vessel, the monitoring system including:
a light source;
transmit and receive optics, the transmit and receive optics including a beam splitter that receives light from the light source;
a scanning device, wherein the scanning device directs light generated by the light source and received from the transmit and receive optics toward a target location;
a window, wherein the window is formed in the pressure vessel and allows light received from the scanning device to be passed to the target location;
a receiver, wherein light reflected from the target location, passed by the window to the scanning device, directed to the transmit and receive optics by the scanning device, and passed by the transmit and receive optics to the receiver, is detected by the receiver; and
a fast shutter, wherein the fast shutter is located between the scanning device and the receiver.

2. The metrology system of claim 1, further comprising:
a processor, wherein the processor is operable to determine a range from the metrology system to the target location from light reflected from the target location.

3. The metrology system of claim 2, wherein the range is derived from an amount of time elapsed between generation of a waveform or pulse of light by the light source and receipt of light from the waveform or pulse of light received at the receiver.

4. The metrology system of claim 1, further comprising:
high speed electronics, wherein the high speed electronics control the fast shutter to block a reflection of the light generated by the light source off of the window, and open the fast shutter to allow light reflected from the target location to pass to the receiver.

5. The metrology system of claim 4, wherein the high speed electronics are implemented by a processor.

6. The metrology system of claim 1, further comprising:
a variable polarization rotator, wherein the variable polarization rotator is located between the light source and the scanning device, and wherein the variable polarization rotator is operable to control a polarization of the light generated by the light source and directed to the target.

7. The metrology system of claim 1, further comprising:
a variable polarization rotator, wherein the variable polarization rotator is located between the receiver and the scanning device, and wherein the variable polarization rotator is operable to control a polarization of the light reflected by the target and passed to the receiver.

8. The metrology system of claim 1, further comprising: variable focus optics, wherein the variable focus optics receive light generated by the light source and direct that light to the transmit and receive optics.

9. The metrology system of claim 1, further comprising:
a variable filter, wherein the variable filter is operable to reduce the power of light received at the variable filter from the light source to control the power of the light exiting the metrology system through the window.

10. The metrology system of claim 2, further comprising:
an acoustic transceiver, wherein the processor controls operation of the acoustic transceiver.

11. The metrology system of claim 10, wherein the acoustic transceiver is located outside of the pressure vessel, and wherein the acoustic transceiver includes an acoustic transmitter and an acoustic receiver.

12. The metrology system of claim 1, further comprising:
a frame; and
a pan and tilt head mounted to the frame, wherein the pressure vessel is interconnected to the frame by a pan and tilt head, and wherein a field of regard of the metrology system can be varied by operation of the pan and tilt head.

13. A metrology system, comprising:
a pressure vessel;
a monitoring system, wherein at least some portions of the monitoring system are contained within the pressure vessel, the monitoring system including:
a light source;
transmit and receive optics, the transmit and receive optics including a beam splitter that receives light from the light source;
a scanning device, wherein the scanning device directs light generated by the light source and received from the transmit and receive optics toward a target location;
a window, wherein the window is formed in the pressure vessel and allows light received from the scanning device to be passed to the target location;
a processor;
a receiver, wherein light reflected from the target location, passed by the window to the scanning device, directed to the transmit and receive optics by the scanning device, and passed by the transmit and receive optics to the receiver, is detected by the receiver, wherein the processor is operable to determine a range from the metrology system to the target location from light reflected from the target location; and
an acoustic transceiver, wherein the processor controls operation of the acoustic transceiver.

14. The metrology system of claim 13, wherein the range is derived from an amount of time elapsed between generation of a waveform or pulse of light by the light source and receipt of light from the waveform or pulse of light received at the receiver.

15. The metrology system of claim 13, further comprising:
a fast shutter; and
high speed electronics, wherein the high speed electronics control the fast shutter to block a reflection of the light generated by the light source off of the window, and open the fast shutter to allow light reflected from the target location to pass to the receiver.

16. The metrology system of claim 15, wherein the high speed electronics are implemented by the processor.

17. The metrology system of claim 13, further comprising:
a variable polarization rotator, wherein the variable polarization rotator is located between the light source and the scanning device, and wherein the variable polarization rotator is operable to control a polarization of the light generated by the light source and directed to the target.

18. The metrology system of claim 13, further comprising:
a variable polarization rotator, wherein the variable polarization rotator is located between the receiver and the scanning device, and wherein the variable polarization rotator is operable to control a polarization of the light reflected by the target and passed to the receiver.

19. The metrology system of claim 13, further comprising:
variable focus optics, wherein the variable focus optics receive light generated by the light source and direct that light to the transmit and receive optics.

20. The metrology system of claim 13, further comprising:
a variable filter, wherein the variable filter is operable to reduce the power of light received at the variable filter from the light source to control the power of the light exiting the metrology system through the window.

21. The metrology system of claim 13, wherein the acoustic transceiver is located outside of the pressure vessel, and wherein the acoustic transceiver includes an acoustic transmitter and an acoustic receiver.

22. A metrology system, comprising:
a frame;
a pan and tilt head mounted to the frame;
a monitoring system mounted to the pan and tilt head, wherein a field of regard of the monitoring system can be varied by operating the pan and tilt head to move the monitoring system relative to the frame; and
an acoustic transceiver mounted to the frame.

23. The metrology system of claim 22, wherein the monitoring system is at least one of acoustic based, a sonar, optically based, or a lidar.

24. The metrology system of claim 22, further comprising:
at least a first two-dimensional target on a surface of the frame.

25. The metrology system of claim 22, further comprising:
at least a first three-dimensional target mounted to the frame.

26. The metrology system of claim 25, wherein the three-dimensional target includes a plurality of spheres having fixed locations relative to the frame.

27. The metrology system of claim 22, further comprising:
- a second pan and tilt head mounted to the frame; and
- a second monitoring system mounted to the second pan and tilt head, wherein a field of regard of the second monitoring system can be varied by operating the second pan and tilt head to move the second monitoring system relative to the frame.

28. The metrology system of claim 22, further comprising:
- a conductivity, depth, and temperature device mounted to the frame.

29. The metrology system of claim 22, further comprising:
- a lift, wherein the lift is connected to the frame by a hinge.

30. The metrology system of claim 22, further comprising one or more of: batteries and a power control system to enable autonomous deployment; a hot stab to enable the metrology system to be connected to local infrastructure for power or communications; communication devices, including one or more of acoustic, optical, or radio frequency communications; lights; cameras; data storage; onboard processors; time synchronization capabilities; chemical sensors; vibration sensors; and thermometers.

* * * * *